Figure 1:
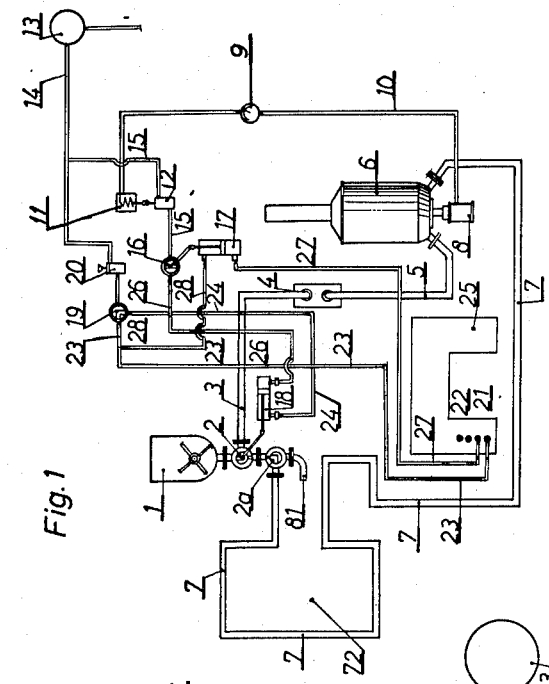

Feb. 1, 1966  S. C. ESTEVE  3,232,829
MACHINE FOR THE MANUFACTURE OF FIBROCEMENT PIECES
Filed Oct. 17, 1962  19 Sheets-Sheet 1

INVENTOR
SEBASTIAN CASANOVA ESTEVE

BY *Jminie and Smiley*
ATTORNEYS

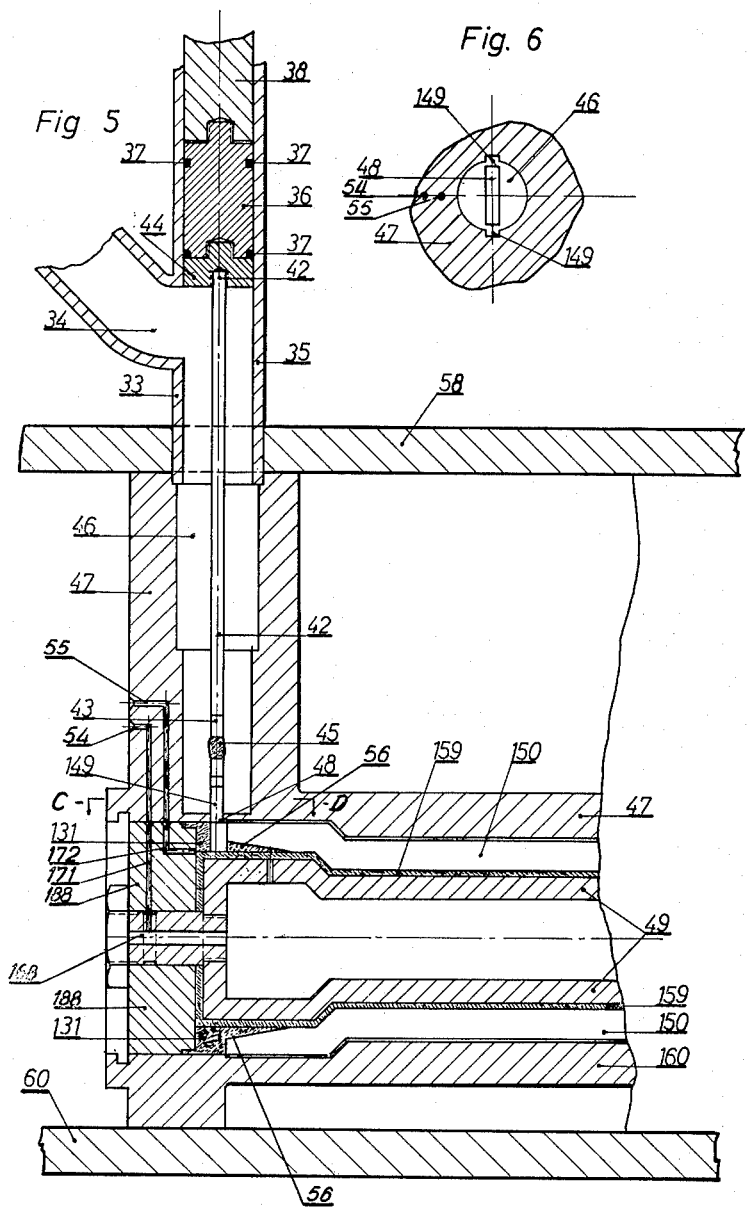

Feb. 1, 1966     S. C. ESTEVE     3,232,829
MACHINE FOR THE MANUFACTURE OF FIBROCEMENT PIECES
Filed Oct. 17, 1962     19 Sheets-Sheet 6
Fig. 8
Fig. 9
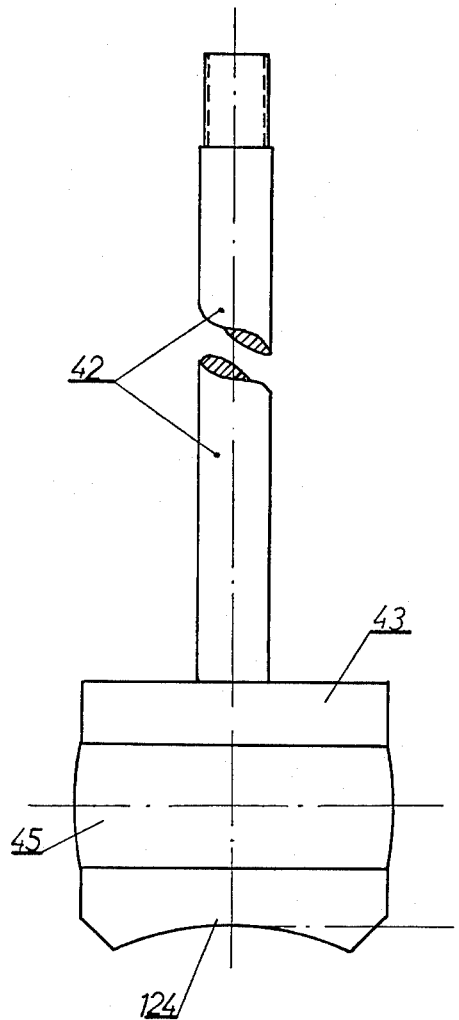
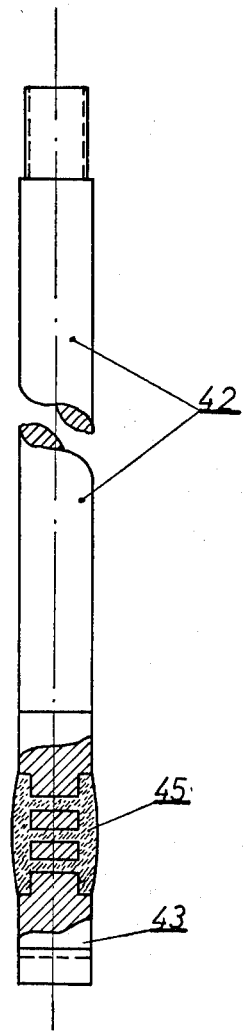
INVENTOR
SEBASTIAN CASANOVA ESTEVE
BY *Jinnie and Smiley*
ATTORNEYS

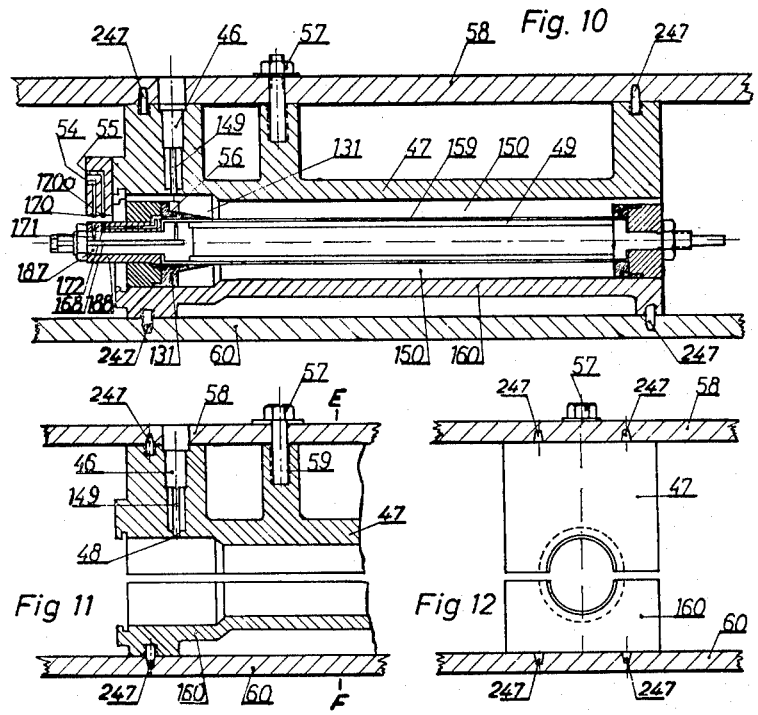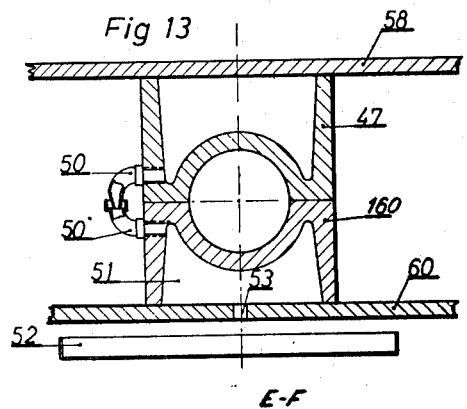

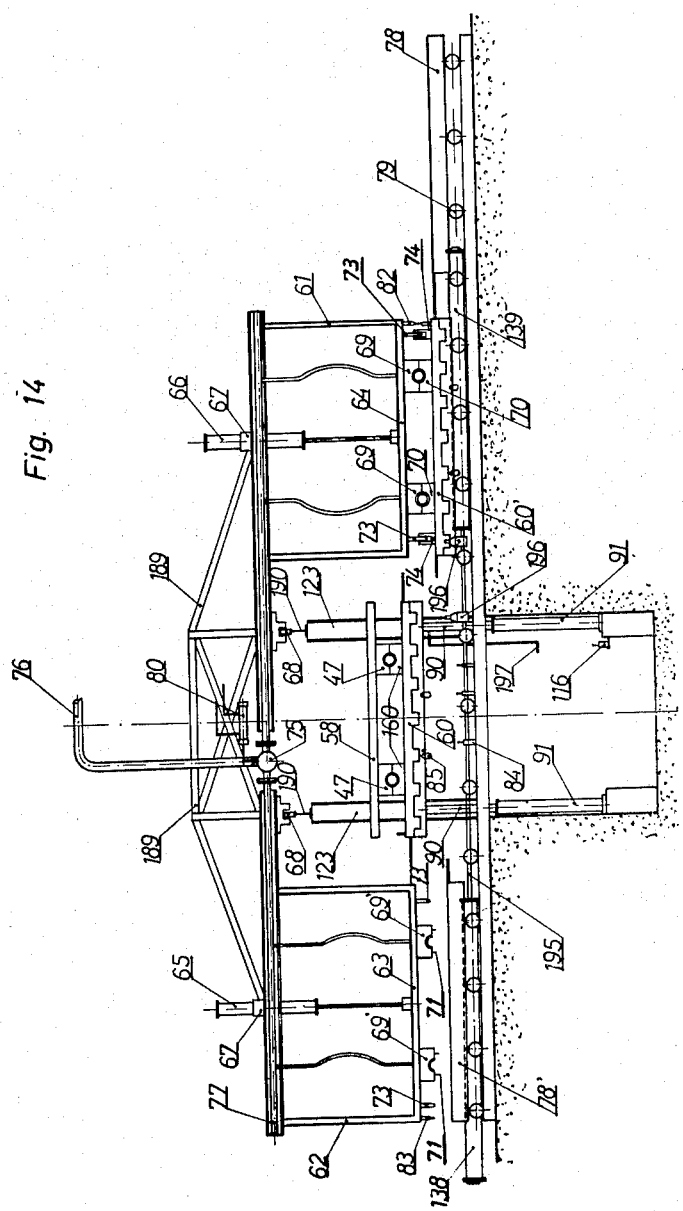

Feb. 1, 1966  S. C. ESTEVE  3,232,829
MACHINE FOR THE MANUFACTURE OF FIBROCEMENT PIECES
Filed Oct. 17, 1962  19 Sheets-Sheet 9

INVENTOR
SEBASTIAN CASANOVA ESTEVE

BY *Jinnie and Smiley*
ATTORNEYS

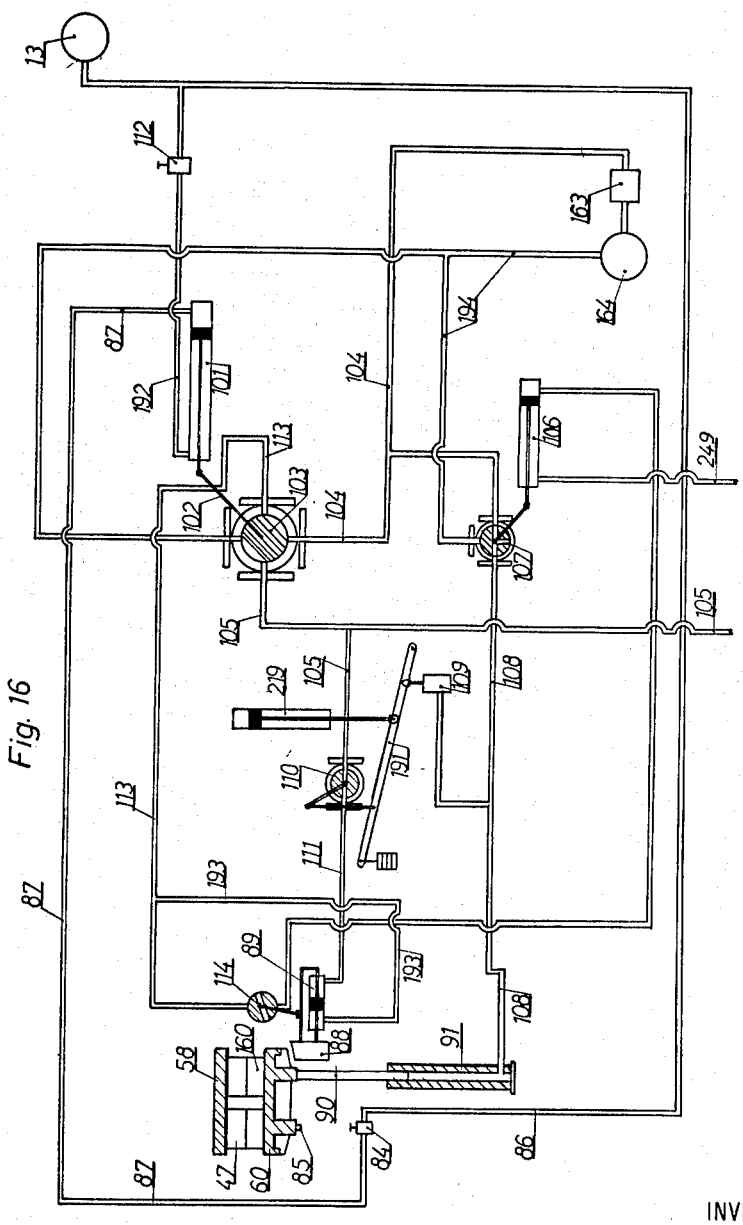

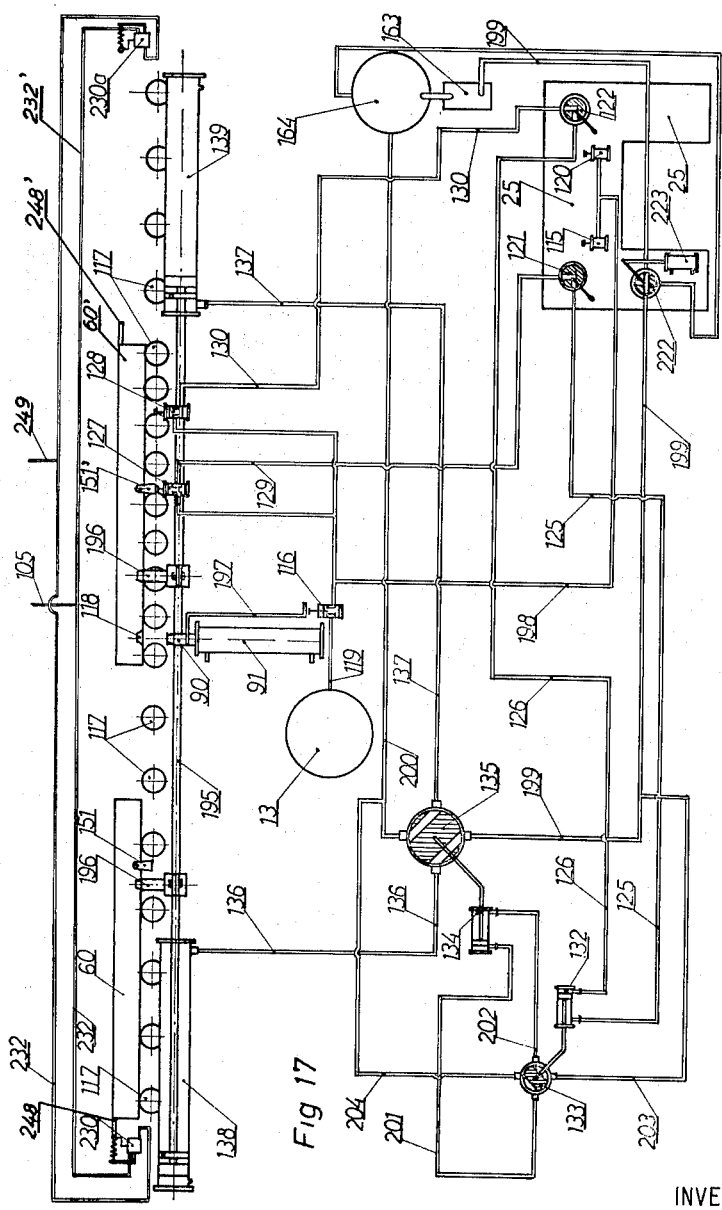

Feb. 1, 1966   S. C. ESTEVE   3,232,829
MACHINE FOR THE MANUFACTURE OF FIBROCEMENT PIECES
Filed Oct. 17, 1962   19 Sheets-Sheet 12

INVENTOR
SEBASTIAN CASANOVA ESTEVE

BY *Irmire and Smiley*
ATTORNEYS

Feb. 1, 1966 S. C. ESTEVE 3,232,829
MACHINE FOR THE MANUFACTURE OF FIBROCEMENT PIECES
Filed Oct. 17, 1962 19 Sheets-Sheet 13
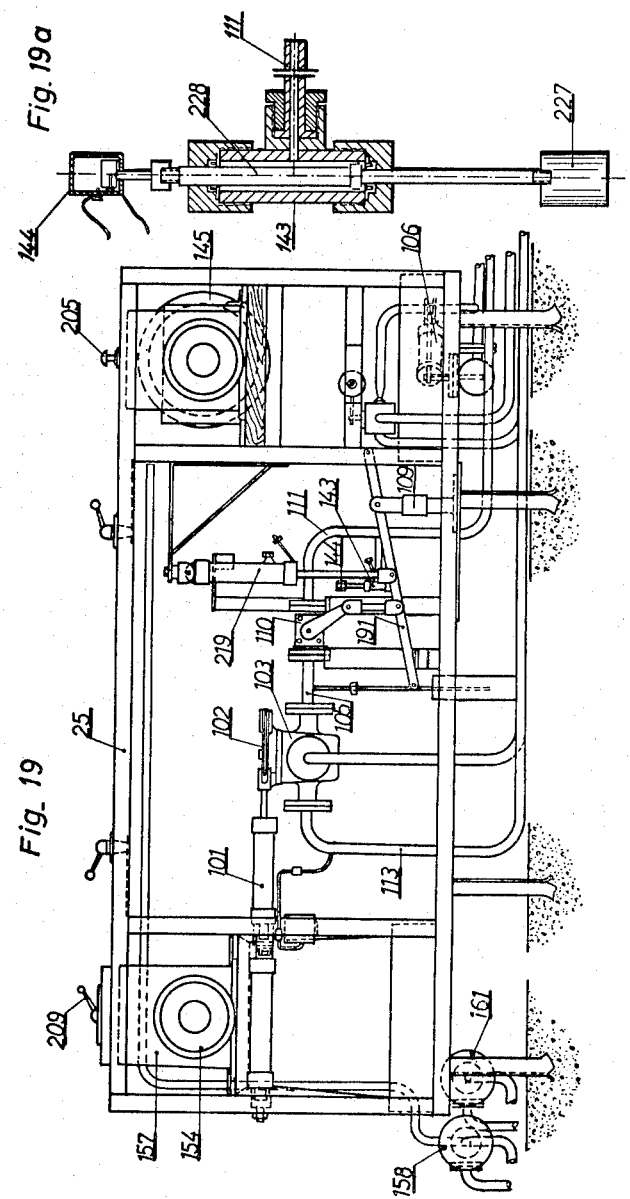
INVENTOR
SEBASTIAN CASANOVA ESTEVE
BY *Jmiie and Smiley*
ATTORNEYS

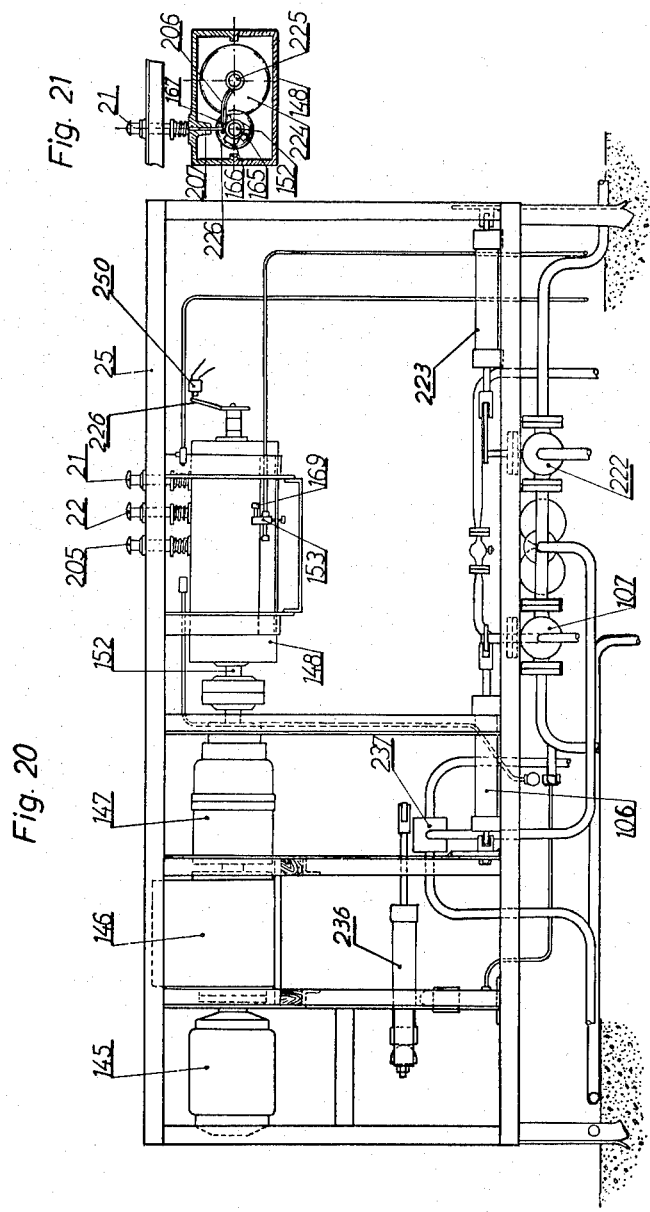

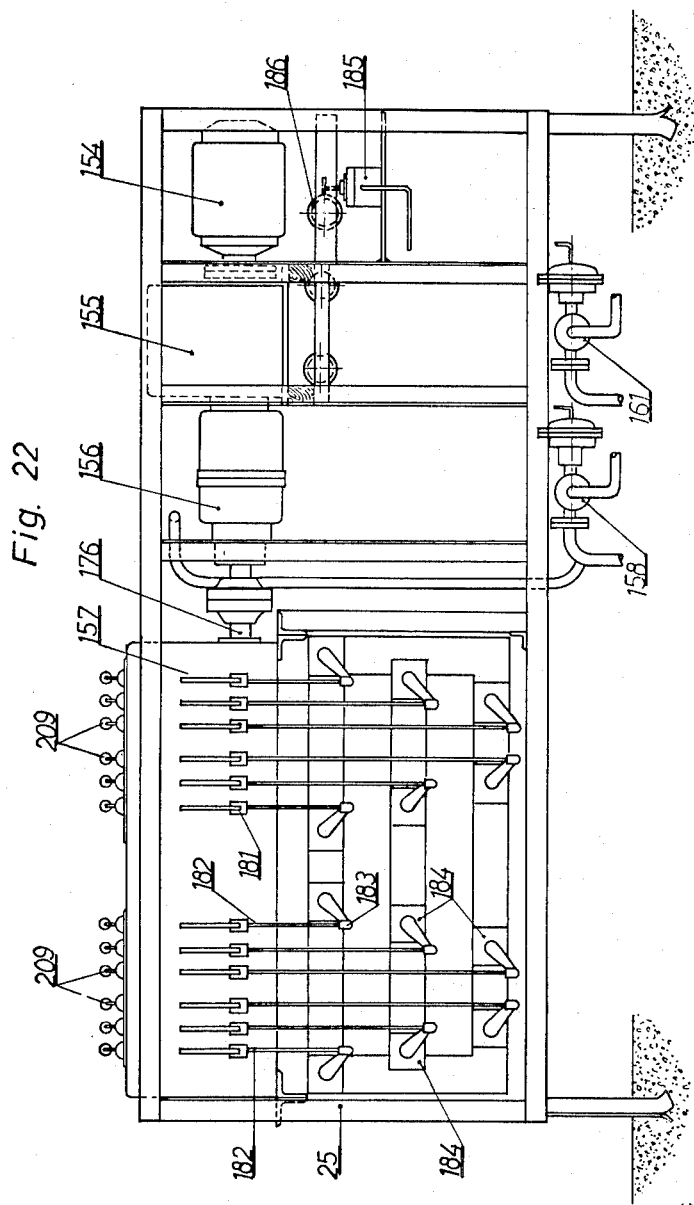

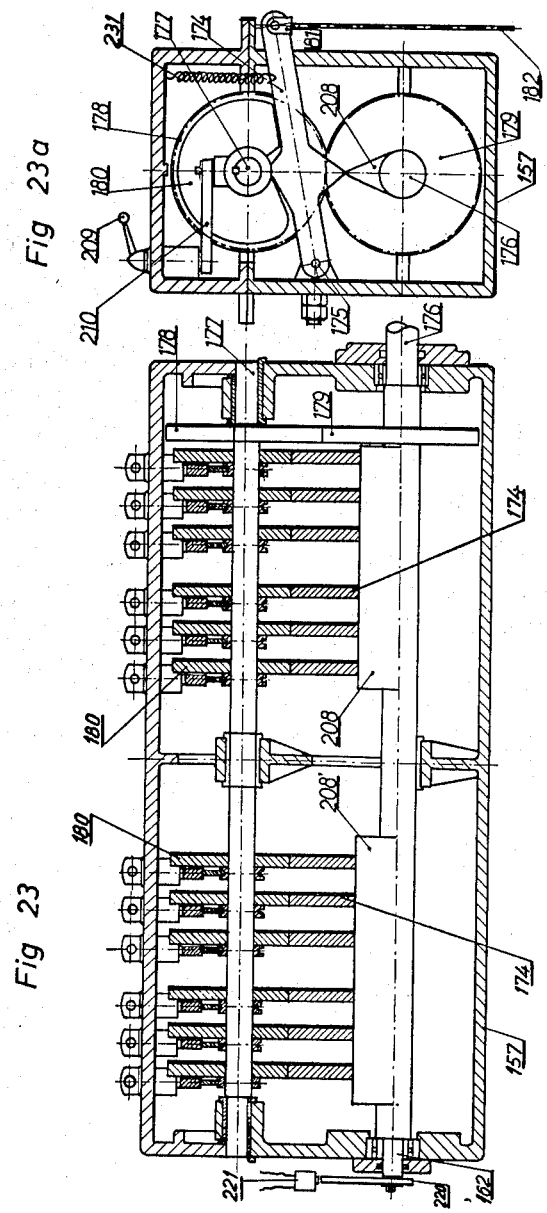

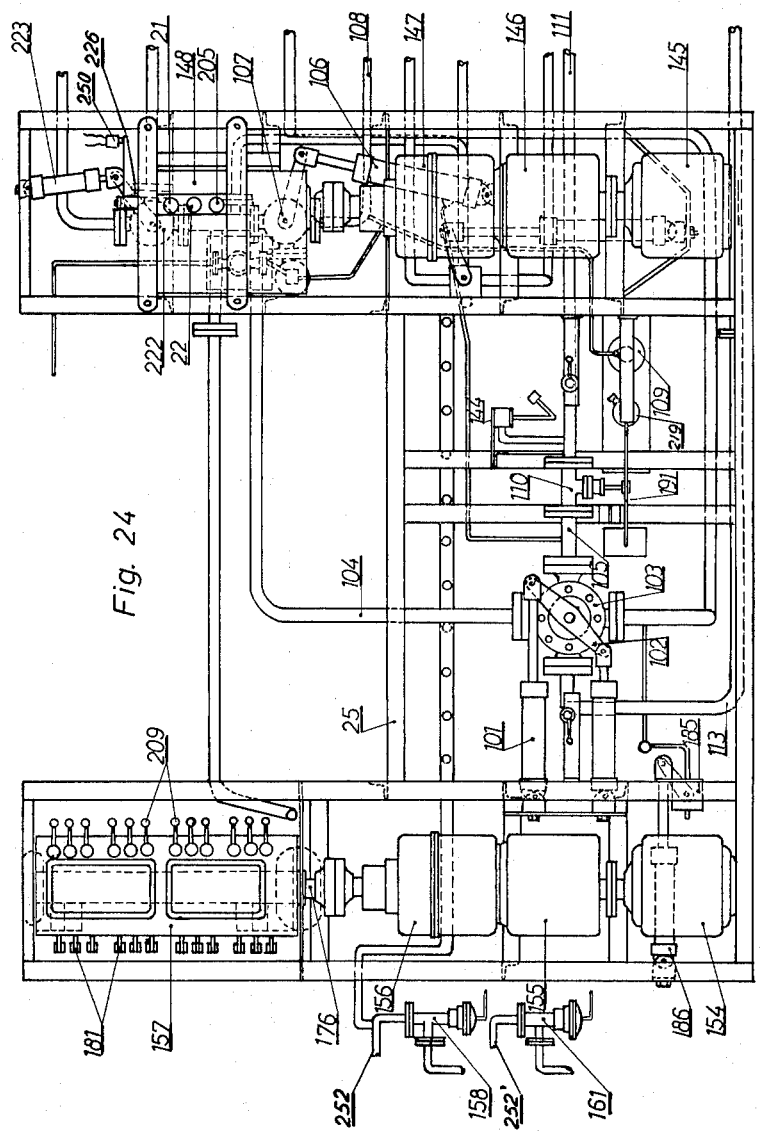

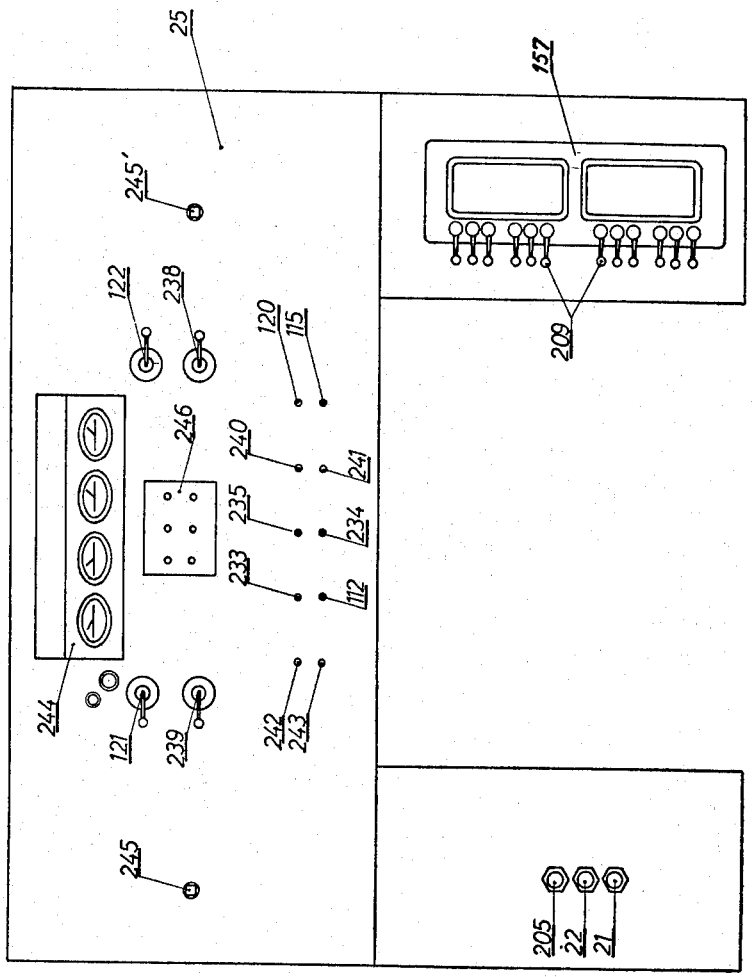

United States Patent Office 3,232,829
Patented Feb. 1, 1966

3,232,829
MACHINE FOR THE MANUFACTURE OF
FIBROCEMENT PIECES
Sebastian Casanova Esteve, Calle de Maria de Molina 3,
Valencia, Spain
Filed Oct. 17, 1962, Ser. No. 231,110
Claims priority, application Spain, Oct. 31, 1961,
271,667
15 Claims. (Cl. 162—401)

The present invention refers to a machine for the manufacture of fibrocement pieces, i.e. pieces composed of moisturized molding medium fibrocement, comprising a mixture of cement, asbestos and water, hereafter termed "slurry" with which any sort of parts can be manufactured, but its preferable application is for the manufacture of hollow pieces such as pipes which may be straight, elbowed or branched as well as other parts whether or not formed as surfaces of rotation.

In the asbestos cement industry several kind of machines and devices are known for the manufacture of pipes, but all of them require a great deal of specialized hand work for the molding of these pieces, causing the yield to be small due to the lengthy manufacturing process.

Most known machines and devices use a rolling press that previously manufactures the flat plate which afterwards is molded in its soft state to obtain the different kinds of pieces.

The machine of the present invention modifies completely the known devices and obtains a considerable economy, does not require a rolling press thus saving the cost of the renewal and replacement of the endless belt. Moreover the machine according to the invention reaches a high yield per hour without any lost time between the working cycles. Another advantage of this new machine is that cheaper asbestos fibres are possible to be used without a great loss of the technical properties of the manufactured pieces.

The machine utilizes exterior molds divided into two halves at a longitudinal level and each half mold being placed in the plate or platform of a hydraulic press. The whole machine includes mechanical, hydraulic, pneumatic and electrical means to obtain an uninterrupted working process in which the most important stages are: the lifting of the platform; the operation of safety devices which prevent their lowering, filling of the slurry into the molds, inflating of the internal molds, loosening of the internal molds from the cast pieces, lowering of the platform, removing the platform from the press, entering of another platform, and removing the cast pieces from the mold, as these phases are carried out automatically, perfectly synchronized and directed from a control stand.

In order to make the following specification more compherensible, various illustrations are attached which represent the whole of the machine in various diagrams of the pneumatic and hydraulic installation and in various views and details. These drawings should not be interpreted in a restrictive sense, as the sole form of the invention because other realizations are possible, and the present illustrations are only given as examples.

The different figures of these drawings are as follows:

FIG. 1, diagram of the slurry feeding circuit to the machine and of the pneumatic ducts controlled by the cocks of said circuit.

Figure 2:
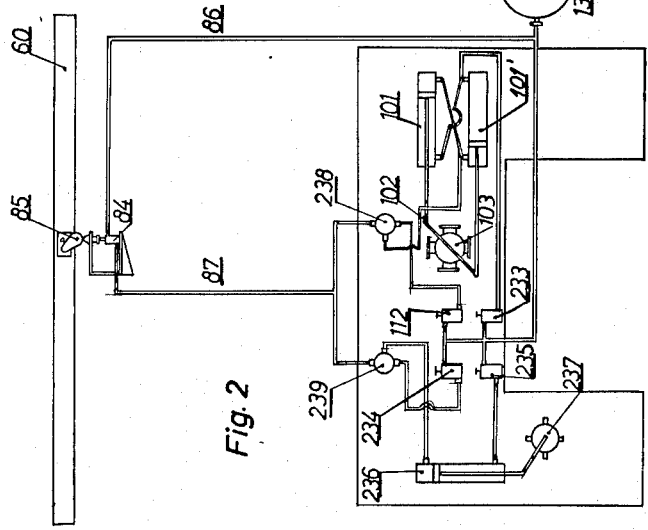

FIG. 2, diagram of the circuit of pneumatic ducts automatically controlled by the cock which controls raising the platform.

Figure 3:
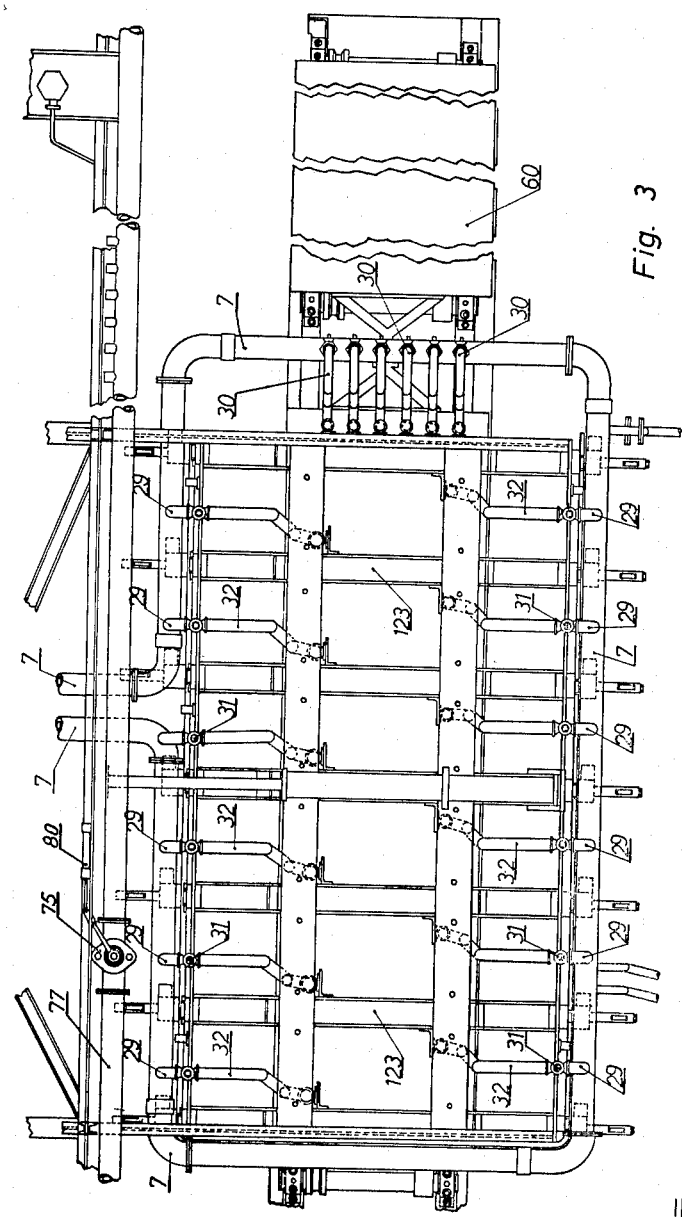
Figure 4:
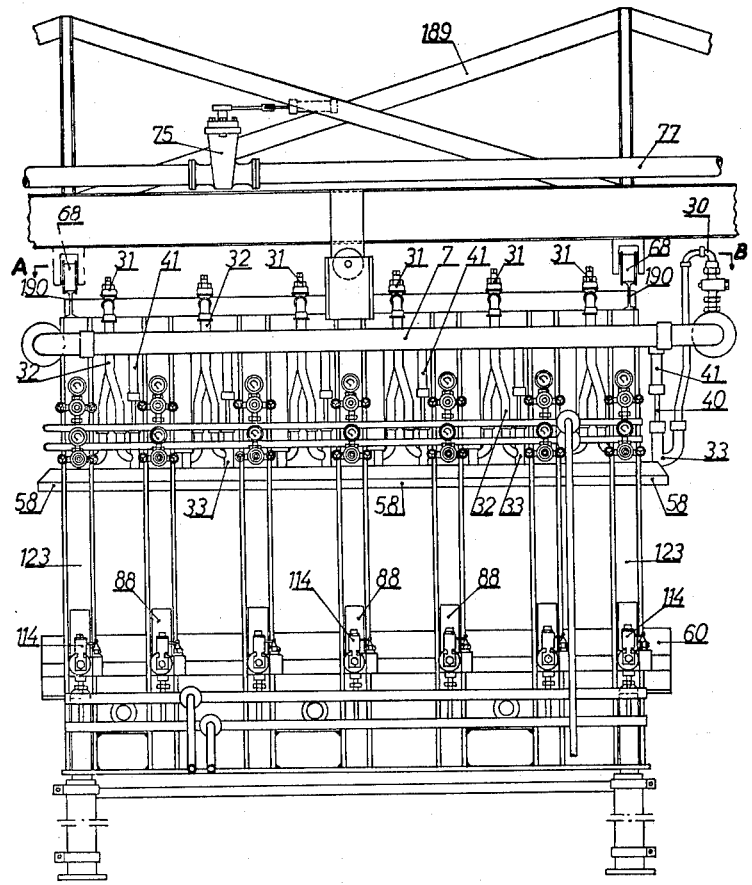

FIG. 3, top view of the principal part of the machine taken from line A–B of FIG. 4.

FIG. 4, side view of the principal part of the machine.

FIG. 5, vertical section of an opened slurry injector device connected to a mold of which only one end can be seen.

FIG. 6, horizontal section taken along line C–D of FIG. 5.

Figure 7:
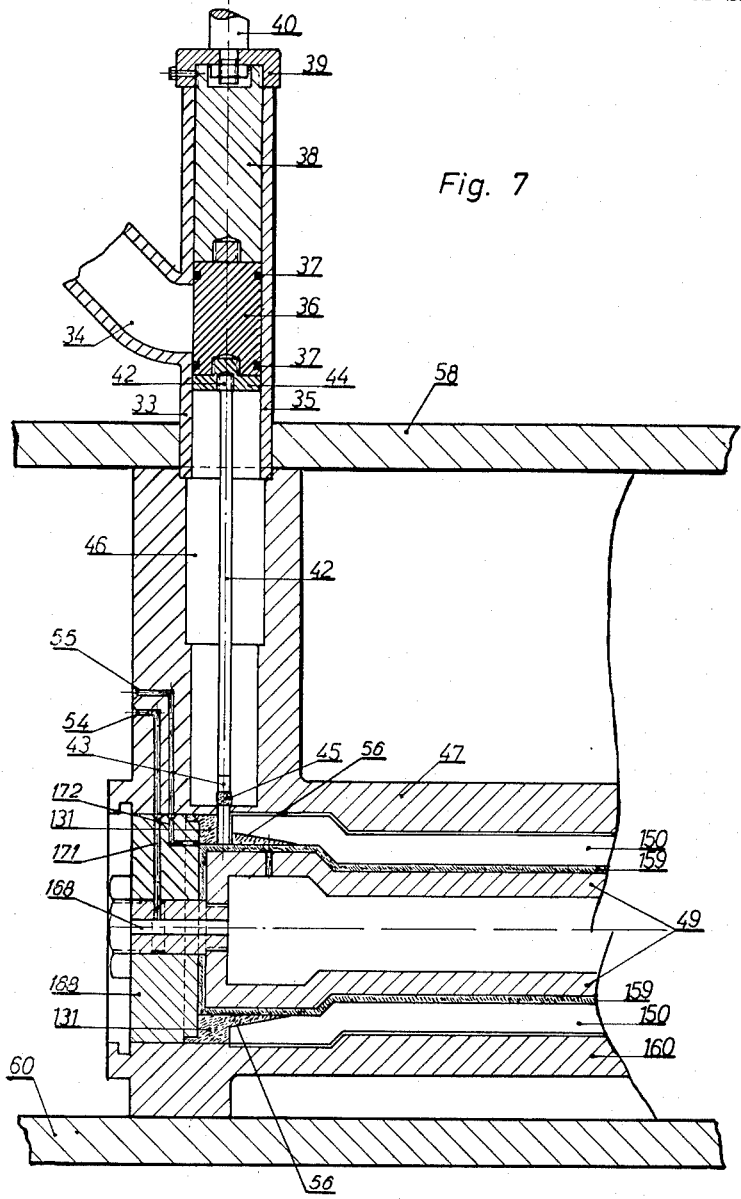

FIG. 7, vertical section similar to FIG. 5 but with the paste injector device closed.

FIG. 8, side view of the obturation mold passage gate of the slurry injector device.

FIG. 9, side view partially sectioned of the obturation gate of previous figure.

FIG. 10, longitudinal section of a complete mold with its two halves joined between the two pressing platforms of the machine and including the inner mold.

FIG. 11, longitudinal section of the end portions of two half molds facing each other and a bit separated, and omitting the inner mold.

FIG. 12, front view from one end of the molds of FIG. 11.

FIG. 13, transverse section taken from line E–F of FIG. 11 is but with the molds joined.

FIG. 14, longitudinal diagram in section of the whole machine illustrating the movements of the piece molding and unloading platforms.

Figure 15:
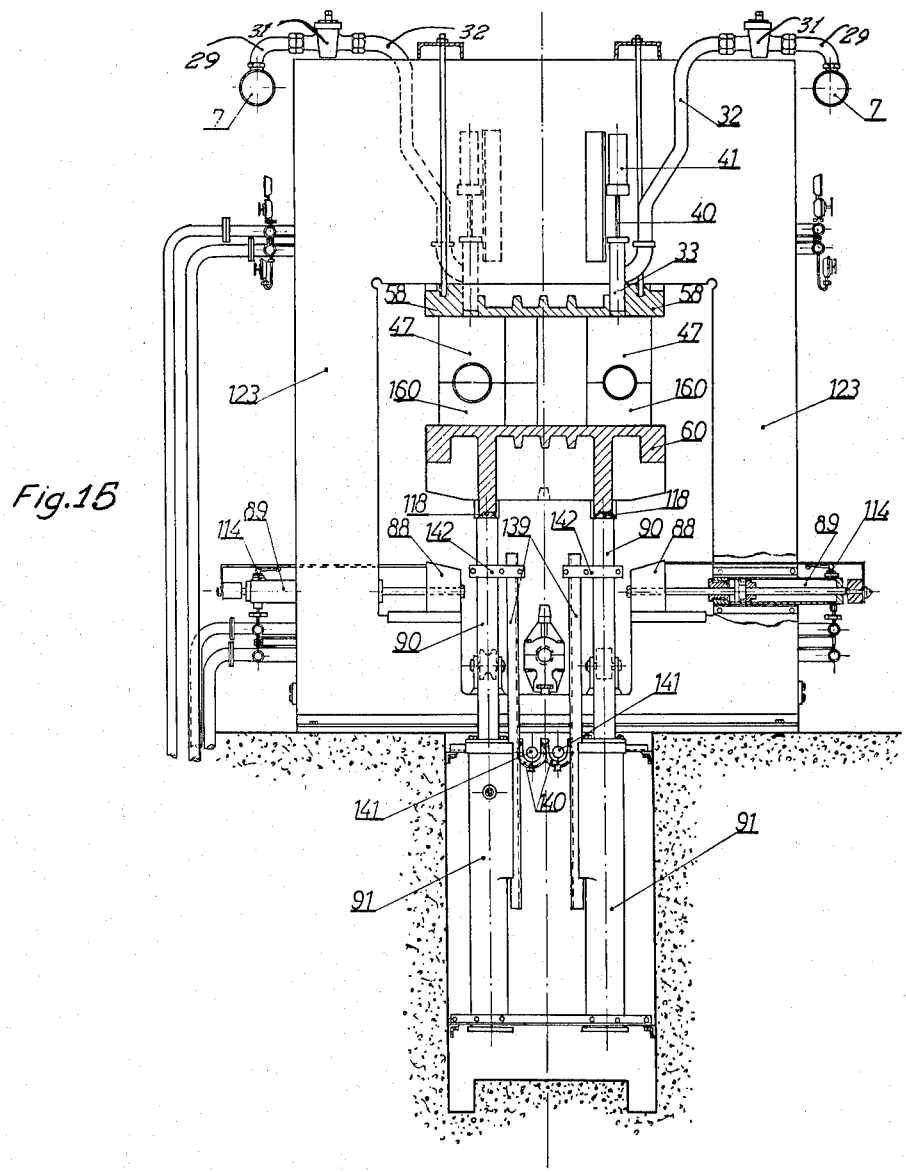

FIG. 15, vertical, central section of the machine partly in elevation.

FIG. 16, diagram of the hydraulic circuits for lifting and lowering the platforms and for moving the brake shoes, and the pneumatic circuits to regulate the cocks interposed in the hydraulic circuit.

FIG. 17, diagram of the hydraulic and pneumatic circuits that act to move the platforms longitudinally.

Figure 18A:
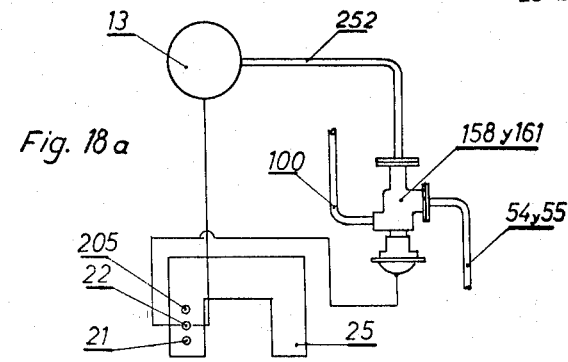
Figure 18:
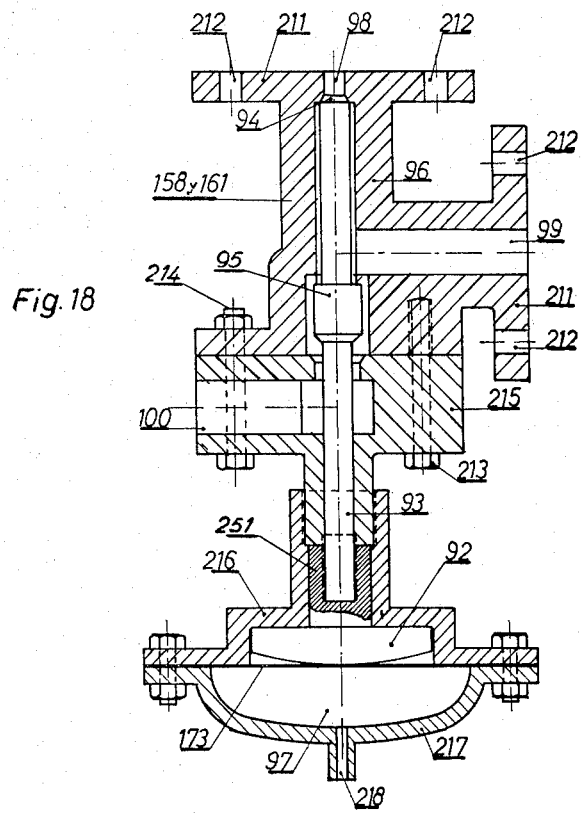

FIG. 18, vertical section of the valve for feeding air to the molds.

FIG. 18a, pneumatic circuit for control of the valve of FIG. 18.

FIG. 19, side view in elevation of the control stand.

FIG. 19a, axial section of the valve of pressure difference controlling air injection to the molds.

FIG. 20, side view in elevation of another side of the control stand.

FIG. 21, vertical section of a cam assembly of said control stand.

Figure 21A:
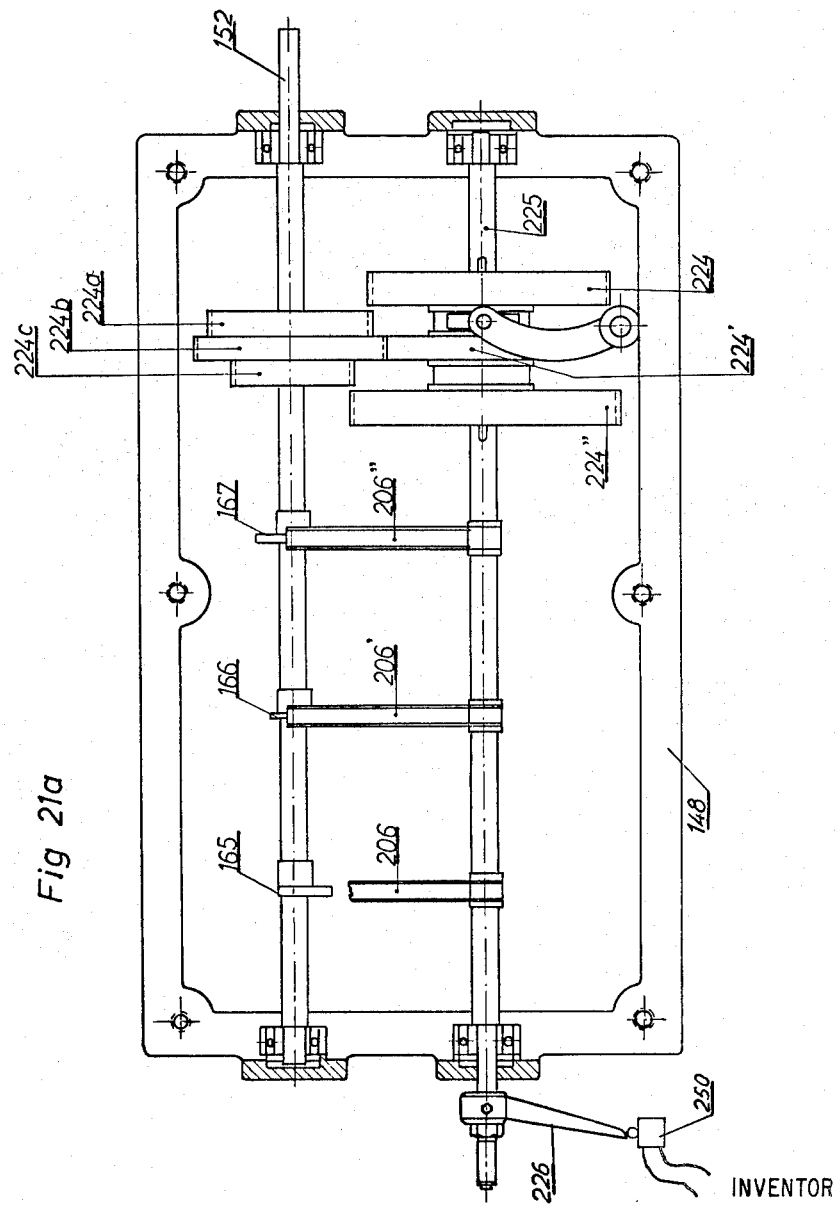

FIG. 21a a horizontal section transverse to FIG. 21.

FIG. 22, side view in elevation of a third side of the control stand.

FIG. 23, longitudinal vertical section of a second cam assembly of the control stand.

FIG. 23a, section transverse to FIG. 23.

FIG. 24, top view of the control stand without the upper cover to present to view its constituent elements.

FIG. 25, plan view of the control stand with its cover panel.

The machine and its working, with reference to these drawings, is as follows:

The supply device for the fluid paste is composed of elements whose relation is shown in the diagram of FIG. 1. This device is composed of continuous closed circuit duct 3, 5, 7 which circulates paste, or slurry, in a fluid state. To said circuit is connected a conventional feed hopper 1 provided with revolving paddles and a cock 2 having three branches interposed in the continuous circuit. Also interposed in said circuit is a pump 4 and a pressure vessel 6 the former of which keeps the slurry in movement. This pipe circuit 3, 5 and 7 does not take the form appearing in said FIG. 1 which is only a diagram except where it constitutes a nearly closed rectangle that encloses the space 72 within which is placed the principal structure of the machine. As can be seen moreover in FIG. 1, in the closed circuit is also interposed another cock 2a having three branches including branch pipe 81.

The cock 2 when open communicates the hopper 1 with the pipe 3 to carry the paste to the pressure vessel 6 by means of the pump 4, and when closed communicates the pipe 3 with pipe 7 which returns to the pressure vessel. This cock 2 is set in motion by means of a pneumatic pressure cylinder 18 of double action that receives pressure fluid through two pipes 24 and 26, 24 being connected to the manual cock 19 mounted on the pipe 14 that connects at one side to the compressed air storing chamber or accumulator 13 with interposed manual push-button valve, or pulsator 20 for releasing a pulse of pressure fluid. The other pipe 26 is connected to the pipe 15 that also receives air from the chamber 13 through the pipe 14 but having interposed the cock 16, set in motion by the pneumatic pressure cylinder 17, and the valve 12 moved by a key driven by the electromagnet 11. This electromagnet 11 is electrically connected to a manometer 9 which through the pipe 10 is connected to the cell 8 which supports the weight of the pressure vessel 6.

The double acting, pneumatic pressure cylinder 17 controlling the cock 16 has a pipe line 27 to which compressed air is admitted or stopped automatically by a valve 22 situated on the control stand 25. The other pipe 28 of cylinder 17 is connected to the pipe 23 which is joined to the cock 19, and supplies pressure fluid to feeding pipe 23 or 24 through the cock 19, if such fluid is given passage automatically by the valve 21 situated on the control stand 25, both valves 21 and 22 being fed air through ducts not shown in FIG. 1.

The described paste supplying device works as follows:

After the asbestos has been properly treated and the slurry mixture has been made in the appropriate fixtures, it is placed into the hopper 1 whose purpose is to maintain the cement and asbestos of the slurry in suspension until it passes onto the actual manufacturing process.

By means of the cock 2 the passage of the paste from the hopper 1 to the pipe 3 is permitted or prevented. The valve 2a will only be used for cleaning the pipes, its purpose being to drain the residual waters from cleaning. Valve 2 has moreover to fulfill another function which will be described later. Pipe 3 will conduct the slurry to the pump 4 which can preferably be of the helicoidal nozzle type with steel rotor and rubber stator. These pumps can reach a pressure of 4 kilograms per square centimeter so that the pressure can be increased by joining several pumps. The slurry is injected through the pipe 5 into the pressure vessel 6 which, as previously stated, is a reservoir where the paste is also kept in agitation. The slurry is submitted to a pneumatic pressure to expel the slurry at pressure through the pipe 7 from which it is introduced into the molds of the machine through the slurry taps to be later described. The position of the cock 2a must always be favorable for the passage of slurry from the pipe 7 to the cock 2. Only when the work has been finished and the necessary cleaning performed to prepare for a renewal of working, is the cock 2a turned to give passage to the pipe 81 thus draining the cleaning water.

The refilling of the pressure vessel 6 with slurry to compensate for slurry injected to fill the molds is effected automatically as follows: when the molds of the machine are taking slurry from the pipe 7, the valve 21 (moved automatically by a cam which will be described later) lets compressed air through pipe 23 and cock 19 to drive the pneumatic cylinder 18 which moves valve 2 to connect the supply hopper 1 with the pump 4 and reservoir 6. Said cock 19 can be closed by hand at a given moment to cut off the automatic operation controlled by the valve 21. In that case the pipe 24 continues being supplied with compressed air, by operation of the pushbutton valve 20 which gives passage to the air coming directly from the tank 13.

The position of the cock 2 should always be of admission of slurry from hopper 1 so that the pump 4 receives slurry through the suction conduit 3 and injects it into pressure vessel 6 through impulsion conduit 5 when the molds are taking slurry from the pipe 7. Thus the fall of pressure which the suction of the pump may produce on the slurry circulating through the pipe 7 is prevented because the cock 2 closes the branch that connects with the pipe 7.

At every moment the decantation of the cement and asbestos of the slurry inside the pipes must be avoided. Decantation could happen during the intervals of time between one supply of slurry to the molds through the pipe 7 and the next. In order to avoid this decantation the pump 4 fulfills the double function of injecting slurry into the pressure vessel 6 when the molds are being supplied from same, and also of impelling the slurry to circulate constantly through the pipes 3, 5, 7 establishing a closed circuit when the paste from pipe 7 is not being consumed.

The other movement of the cylinder 18, i.e. the one in which the cock 2 has to adopt the position of a closed slurry circuit is of course related to the quantity of slurry present in pressure vessel 6 and the cock 2 is intended to change its position when the slurry feeding period to the molds is finished, provided an adequate supply of slurry is present in pressure vessel 6. To this end the valve 12 is normally in the open position, i.e. letting the compressed air through the pipe 15 till the conical cock 16 closes. When the molds are being fed with slurry, i.e. when the paste circuit is closed at 2, the valve 16 interrupts the passage of compressed air (as can be seen in FIG. 1) owing to the position of the piston in cylinder 17 which is receiving pressure through the pipes 28 and 23 opened by the valve 21.

When the feeding of slurry to the molds has finished, the mechanisms to be described later, drive the valve 22 which lets compressed air through the pipe 27 to raise the piston of cylinder 17, thus the cock 16 opens to let the pressure fluid through to the pipe 26 to move the piston of cylinder 18 and with it close the cock 2 so that the pipes 3, 5, 7 form a closed circulation circuit for paste thus interrupting the refilling of the reservoir 6 with paste. Normally the valve 12 is held open pressed by its spring and thus lets the compressed air, which it is receiving from the accumulator 13, through the pipes 15 and 14. When the pressure vessel 6 has insufficient paste, and the feeding of paste to the molds has finished, the electric-magnet 11 connected to the electrical contacts of 9 will will move the valve 12 to close preventing the passage of the pneumatic fluid through the pipe 15 to the cylinder 18 and therefore the cock 2 will remain in the same position shown in FIG. 1. The same will happen in the following cycle if the reservoir 6 still admits slurry. When the pressure vessel 6 is full or contains an adequate amount of slurry, the electric switch contact of the manometer 9 will open the circuit to the electromagnet 11 so that valve 12 will open and compressed air will have free access to the cylinder 18 to close the cock 2 to hopper 1.

The machine comprises a principal portion constituted by a metallic frame structure 123 like that of a hydraulic press (as can be seen in the FIGS. 3, 4 and 14). Stationary in its interior is the plate or platform 58 on which are screwed the half molds for the pieces to be manufactured. Frame 123 constitutes the general support for most elements of the machine and around it is mounted the pipe 7 that conducts the fibrocement slurry as can clearly be seen in FIG. 3. On the two longer sides of the rectangle formed by the pipe 7 there are some branch pipes 29, twelve for example, of which six are on each side, but there may be more or less, and they can have any other arrangement according to size, capacity of production and other cirumstances of the machine. These branch pipes 29 are slurry taps for feeding the molds and generally they are destined to feed molds for parts of irregular shape forms that do not correspond to bodies of rotation, such as bent pipes, pipes with bifurcations, elbows and others. There are other branches 30 of the pipe 7 which in the example are placed in one of the smaller sides of the rectangle formed by said pipe 7 these branches or taps 30 being destined to feed molds for straight pipes.

The machine of the illustrated embodiment can contain on its plates or platforms, twelve molds for irregular shaped pieces, or six for straight pipes, although it can mold simultaneously both kinds of pieces by arranging the molds of both kinds for which there are room on the platforms. There are some valves 31 that control the passage of the slurry from the pipe 7 to the pipes 32 and thus can be established a circuit round the principal body or press without admitting the paste to the molds, which is of interest in case one wishes to work with fewer molds because some are damaged, or in any other situation or necessity. Cleaning of the machine is also improved as there can be established a circuit for clear water that will wash down all the remainders of slurry which has circulated through the pipes during the work.

Each of the pipes 32 and also the pipes 30 are connected to the ducts 33 which shall be referred to herein as injectors because it is their purpose to introduce the fibrocement slurry from the pipes 30, 32 into the molds. As can be seen on FIGS. 5 to 9 each injector 33 is constituted by a straight tube 35 with a branch 34 through which the slurry arrives. Sliding in the interior of part 35 is a piston 36 which when lowered, plugs the passage of the slurry from branch 34 if it is facing it and when in raised position freely permits entry of the paste. In the piston 36 are placed the rubber sealing rings 37 that are especially disposed to prevent the passage of liquids at pressure.

The piston 36 is screwed on a cylinder 38 to the other end of which is secured the cap 39 (FIG. 7) fixed by a screw or other means. The cap is joined to the end 40 of a rod of the hydraulic cylinder 41 (FIG. 4). An intermediate part 44 is threaded or otherwise secured in a cavity of piston 36 and to it the upper tip of the rod 42 of the mold passage gate 43 is secured. The piston 36 joined to the piston of the hydraulic cylinder 41 (FIGS. 4 and 15) and moved by it, will displace in longitudinal direction of the straight part 35 of the injector 33, thus according to its position either stopping or admitting slurry to pass to the straight part 35 of the injector (FIGS. 5 and 7) by closing or opening branch 34. The rod 42 has a length which covers the distance between the piston 36 and the inner part of the mold 47, into which the injector 33 is fitted (FIGS. 5 and 7) with interposition of the platform 58. The lower end of each rod 42 carries the gate 43 covered with rubber 45 in the zone of obturation of the mold passage and slightly curved surfaces in said zone. The lower edge of the gate 43 will have a curvature 124 in accordance with the shape of the piece which one desires to manufacture as can be seen in FIG. 8.

The upper half molds 47 (FIGS. 5, 7, 10 and 11) have at one of their ends, or at any other place, a bore 46 of two different diameters which in the smaller part has two channels 149 that serve as guide for the gate 43 in its vertical movement. At the bottom of said bore is an inlet opening 48 (FIGS. 5 and 6) for the passage of the fibrocement slurry to the inner molding space 150. At the head of the mold and around the inner mold constituted by tube 49 and inflatable liner 159 is disposed a rubber ring 131 in the body of which the inlet opening 48 is extended for penetration of the gate 43 into this ring.

Once finished, a cast part will not have any external indication of the place where the injection was made, because the gate hermetically closes the inlet opening 48 for injection into the mold 47 and prevents any dropping of slurry. FIG. 5 shows the injector 33 with the piston 36 in the proper position to allow the passage of slurry through the branch 34 and to the gate 43 letting the slurry enter at pressure into the mold 47 through the opening 48 to fill the space 150 between the mold 47 and the core or inner mold 49 covered with the resilient liner 159. In FIG. 7 can be seen the contrary position of the piston 36 closing the branch 34 and with the gate 43 closing inlet 48 tightly. The first position (FIG. 5) is that of feeding with slurry, while the second (FIG. 7) is that which coincides with the inflating of the rubber tubes 159 and resulting compression of the injected slurry that fills the space 150.

The machine comprises also two similar movable platforms 60 and 60' (FIGS. 4 and 14–17) which move longitudinally of the frame and, when one of said platforms is situated in the frame 123, it may be elevated, as shown in FIGS. 10–15. Platforms 60 and 60' carry the lower half molds 160 and 70 and, when elevated, couple them with the upper half molds 47 hanging from the upper stationary platform 58. At that moment the machine is ready to receive the slurry in the molds. For this purpose the cocks 31 (FIGS. 3, 4 and 15) will be opened letting the slurry reach the injectors 33 through the pipes 32; the cylinders 41 are operated to place the pistons 36 in their elevated positions and the gates 43 uncovering the inlets 48 through which the slurry penetrates into the molds filling the spaces 150.

After the slurry has been injected into the molds as explained and slightly dehydrated because of the injection pressure itself, the resilient liners 159 will be inflated by introducing air between liner 159 and the core 49, so that paste in the space 150 will be compressed and further dehydrated (FIGS. 5, 7 and 10). For this purpose valve 22 on the control stand 25 (FIGS. 1, 20, 24 and 25) is automatically moved as will be explained later. Said valve 22 operates the membrane valve 158 (FIGS. 18, 18a, 19 and 22) allowing compressed air to pass to duct 171, FIG. 5, through duct 54 and pivot connection 170, FIG. 10, and then pass through orifice 168 to the space between the rubber liners 159 and the core or inner mold 49, causing the liner to inflate.

A rubber seat, unnumbered, maintains a very close contact between the pivot connection 170 of the air valves and the duct 171. As can be appreciated in said FIG. 10, the air conduit 168 and the duct 171 are formed at the head 187 of the inner mold or core 49.

Dehydration water produced by the pressure of the inflated liner 159 is conducted to a tray 52 (FIG. 13) situated below the platforms from where it is conveniently collected for evacuation. For this purpose, the mold communicating pipe 50 is disposed so that the dehydrated water in the upper mold 47 passes to the pipe 50' and from there to the cavity 51 of the lower mold 160 falling on the tray 52 through the orifice 53 in the platform 60 or 60'.

Close to the duct 54 (FIGS. 5 and 10) is another duct 55 with pivot connection 170a through which compressed air passes at the same time as the liners 159 are deflated. This air passes through the conduit 172, in a socket 188, FIG. 7, that covers the head 187, and penetrates into a space 56 between the liner 159 and a rubber ring 131 arranged around the core at the feeding end, and continues then to the space between the outer surface of the rubber liners 159 and the cast part (not visible on the drawings). By means of this injection of air between the liners 159 and the already molded fibrocement piece which, as has been said, is carried out at the same time as the layers are deflated, deformation or roughness is prevented that would result in the molded piece if its soft surfaces were abruptly separated from the liner by vacuum or bending movement. Therefore, this air feed may be called an injection of air against bending or inflection. The beginning of this counter inflection injection of air and its interruption may be carried out automatically by means of a pneumatic valve 205 situated on the control stand 25, FIG. 20, operating the membrane valve 161, FIGS. 19 and 22.

The operation of the membrane valves 158 and 161 for feeding compressed air for inflating the elastic linings, and air for preventing roughness and bending on deflation of the linings will be described later.

The above mentioned rubber ring 131 (FIG. 10) is arranged around the end of the inner mold 49 covering the rubber liner 159 and the thickness of its body or walls diminishes towards the edge, i.e. the ring provides a truncated conical inner space 56 between itself and the liner that permits the introduction of air between the liner and a cast part.

Compressed air when injected into space 56, also functions to dry the already molded piece because it is introduced into the hollow portion, i.e. in the interior of said piece thus obliging the air to pass through the walls of the fibrocement mass.

The orifices 53 in the platforms 60 or 60' for the passage of dehydration water drained to the trays 52 are arranged in such a way that they can be used for any mold which may be employed. The half molds 160 and 70 can moreover be fixed to the platforms 60, 60' by any known means. Good fixing means which in trials have given a good result and which enable rapid placement of the lower molds in working positions, are the pins 247 which locate in openings in the platforms to position any mold. Screws 57 are lodged in the orifices 59 to attack the upper half molds 47 to the upper platform 58 (FIGS. 10, 11 and 12).

As has already been pointed out, the platforms 60 and 60' that bear the lower half molds 160 and 70 move lengthwise by means that will be explained later, and they are placed alternatively inside the principal frame of the machine or outside it according to the manufacturing stage. When one platform is inside, it is lifted until its half molds join with the upper half molds attached to the fixed platform 58 at which moment the molds are fed with paste and the pieces are molded as has been described.

When the pieces have been molded this will be noticed by the circumstance that air is leaving through the valve 161, FIG. 18. At this moment and by means of the pushbutton valve 112 (FIGS. 16 and 25) on the control stand the lowering of the platform 60 or 60' (depending on which is in the press) will occur and the platform will be removed to one side outside the press frame 123 to occupy a position where the cast part is taken out of the mold, while the other platform with its already prepared half molds will be moved inside the press frame to be lifted and to join its half molds with the upper ones for repetition of the working cycle.

When the platform 60 or 60' bearing the cast parts reaches its destination outside the space occupied by the frame 123 of the press, it will be necessary to remove the molded parts in order to free the molds in condition to be employed again. The cast parts are on the lower mold halves 160 or 70 with the inner core 49 inside the part. To remove the cast part rapidly without damaging their structure and appearance, the machine is fitted with the extractors 61 and 62 (FIG. 14). These extractors include the platforms 63 and 64 provided with a lifting and lowering movement transmitted by the hydraulic cylinders 65 and 66. The cylinders are mounted respectively on the strong supports 67 having a metal frame 189. The whole extractor ensemble bears on the wheels 68 riding on the rails 190 mounted on the upper part of the press. Thus the previously described ensemble can move the platforms 63 and 64 in a transverse direction to free the space they occupy where the cast parts are taken out of the mold. This operation will be carried out when it may be necessary to change molds. A hydraulic cylinder (which cannot be seen in the drawing) performs this movement under control of the hydraulic valve 185 moved pneumatically by the cylinder 186 (FIG. 24) positioned on the control stand 25.

Below the extracting platforms 63 and 64 are fixed some other half molds 69 and 69', by means of a similar device to those explained previously for the half molds 47 on the fixed platform 58, in such a way that when the platforms 63 or 64 are lowered to superpose half molds 69, 69' on the half molds 70 or 160, they coincide and adjust to the cast parts. The half molds 69, 69' have conical pins 71 that fit into perforations (not visible in the drawings) in the lower molds 70 and 160 to correctly position the upper molds for extraction of the cast parts. The rods 73 of the extractor platforms 63 and 64 and their complementary bolts 74 situated on the sliding platforms 60, 60' similarly act as positioning means.

When the cast parts in their lower half mold 70 or 160 are covered by the fastened upper half molds of extraction 69 or 69', the cores and resilient liners 159 inside the cast parts are removed first. Then vacuum is introduced in pipe 76 connected with a pump and through the open valve 75 (FIG. 14) transmitted to the pipes 77 to act on the cast parts through perforations in the half molds of extraction 69 or 69'. The object of the valve 75 is to interrupt this vacuum at the right moment.

When the vacuum has been exerted on the parts in a soft state, platforms 63 and 64 are lifted to reach the position of FIG. 14 carrying the cast parts adhered to extractor molds 69, 69' and separating them from the half molds 70. At this moment the cores 49 will be replaced in the lower half molds 70 and the platform 60', which is separated outside the press, is moved to occupy its place within the frame 123. Platform 60' drags along the small cart 78 placing it below the extracting platform 64 or 63 which together with the pieces adhered by vacuum to the half molds 69 or 69' are waiting to be lowered. The outer carts 78 and 78' bear interchangeable boxes having soft bottoms to receive the cast parts. A good bottom for receiving the cast parts may constitute a bed of cork chips. When the cart 78 sliding on the rolls 79 and dragged along by the platform 60' has occupied its place, the extracting platform 64 (which was at the lifted position) will begin its descent until it places the pieces it bears attached to their half molds 69 in contact with the bottom of cork chips of said cart. At this moment the cock 75 will change its position, moved by the pneumatic cylinder 80, so that the vacuum in the molds 69 of the extracting platform 64 is interrupted to begin the suction in the extracting half molds 69' situated in platform 63 as an effect of the communication that the valve 75 has through the pipes 77 with the half molds of the platform 63.

The cast parts, now free from the suction the vacuum exerted on them, will loosen from the extracting half mold 69 or 69' and remain on the cork bottom of the carts 78, 78' where they will be kept for a period of 4 or 5 hours. To enable use of the carts 78, 78' during this period the boxes with the cork bottoms will be substituted by others and so on. Or the parts may be taken directly from the soft bottom by hand, a proceeding which has given good results in practice, especially when concerned with fitting pipes such as bent pipes, elbows and branches.

Four or five hours after the pieces have been molded, they can be withdrawn from their boxes and these are returned to the manufacturing cycle.

Both platforms 64 and 63 have coincident lifting and lowering movements so that when 64 is lowered to leave parts on the cork bottoms of the carts 78, the platform 63 also is lowered to collect parts from the half molds. While the platform 64 rises with the parts, the platform 63 rises empty thus permitting the movement of the platforms 60 and 60' outside and inside the frame 123 of the press. This simultaneity of movements favors the automatism of this part of the machine.

As the directions of the vacuum that is necessary for the extraction of pieces on both platforms 63 and 64 are contrary, we can transfer the vacuum to one or another from the cock 75 and, for this purpose, the pneumatic valve pushbuttons 82 and 83 are placed on each of the extracting platforms 63 and 64 connected by flexible pipes (not visible on the drawings) to the double acting pneumatic cylinder 80 that changes the position of the cock 75 which supplies the extracting half molds with vacuum.

It will easily be understood that when the extracting platform 64 is descending and contacts the platform 60', it will push the button 82 and the pneumatic cylinder 80 will then receive pressure and move the position of the cock 75 thus establishing a vacuum in 69 but removing vacuum from the half molds 69' of the extracting platform 63 so as to release parts on the cart 78'. The pushbutton 83 on the extracting platform 63 contacts the soft cork bottom and will not be moved by this material. The lowering movement of the two extracting platforms 64 and 63 will be automatic and will coincide with the rising of the platform 60 which is in the press.

To effect automatically the lifting of the platforms 60 and 60' which bear the half molds 160 and 70, the machine has elements that will be mentioned below and which can be seen on the diagrams of FIGS. 2 and 16. Both platforms have the same elements, but in describing them reference will be made only to the example shown in the mentioned figures on which appear only the platform 60.

Said platform 60 (FIGS. 2 and 16) has at its lower part an oscillating rod 85 which when the platform is moving and placing itself in position to be lifted between the supports 123 of the press, will push against feeler 85 to open normally closed valve 84 and pipe 86 to passage of the pressure fluid fed by the pressure chamber 13. When the valve 84 is pushed, the pneumatic fluid passes through the pipe 87 to the pneumatic cylinder 101, the rod of which inverts, by means of the lever 102, the position of the four way cock 103, which through the pipe 104 communicates with a hydraulic pressure pump 163 being supplied liquid from the chamber 164. When the cock 103 is moved, the pipe 105 receives and conducts pressure liquid to the hydraulic cylinder 106 through duct 249, FIG. 17, inverting the three way cock 107 so that the pressure liquid passes to the pipe 108 which connects to the cylinders 91, the pistons and rods 90 of which elevate the platform 60. This platform has some grooves 118 (FIGS. 15 and 17) at its bottom to receive the conical heads of the rods 90. The other elements illustrated in the diagrams of FIGS. 2 and 16 have no mission in this rising movement of the gliding platforms that bear the molds.

Concurrent with the rising movement of the platform 60 (or of 60') is effected the descent of the extracting platforms 63 and 64 with a proper automatic device that relates both movements by hydraulic and pneumatic means.

In FIG. 2 are two cocks 238 and 239 that may be used to suppress the automatism in the lifting movements of the platforms 60 or 60' or the descent of platforms 63 and 64.

The manual pushbutton valves 112 and 233 are situated at the control stand and are connected to a compressed air accumulator for operating the cylinders 101 that control the valve 103.

If the cock 238 is open, the pressure from the feeler valve 84 will reach directly the cylinders 101 in which case the rise of the platform will be automatic, but if cock 238 is closed by hand the pressure fluid from 84 will be cut off, and the platform can only be elevated by manually operating pushbutton valve 233 to send pressure fluid to cylinder 101.

The cock 239 and the pushbutton valves 234 and 235 as well as the cylinder 236 that controls the valve 237 are the elements by which the extracting platforms 63, 64 can be raised and lowered.

These elements operate in a similar way to those described above which regulate the automatic or manual fluid circuit means for elevation or descent of the platforms 60, 60'.

When the cock 239 is open, the pressure from pushbutton valve 84 passes through the pipe 87 and reaches the cylinder 236 which inverts the position of the cock 237 that regulates the movement of the extractors. Since the operation of the pushbutton valve 84 is automatic, the raising and lowering movements of the extractors will also be so, furthermore, the elevation of the platform 60 or 60' will coincide with the descent of the extractors 63 and 64. If the cock 23 is closed, though the feeler 84 is driven automatically, the pressure that reaches the cock through the pipe 87 will nevertheless be cut, thus the cylinder 236 can then only be driven by means of the hand pushbutton valves 234 and 235. In such case the movement of the extractors will not be automatic.

To prevent the platforms 58 and 60, or 58 and 60' and the respective half molds coupled between them from separating as a consequence of the pressure produced inside the molds when the resilient layers 159 are inflating (FIG. 10), the machine comprises also two sets of wedges 88 (FIGS. 15 and 16) which are placed on both sides of the platforms between the sides of frame 123. Wedges 88 have a transverse movement so that they can be moved to a position below the platforms 60 or 60' in order to prevent their descent, or can be withdrawn out of the zones of vertical movement of the platforms, in order not to obstruct their descent. These wedges movements are caused by the double acting hydraulic cylinders 89 (FIGS. 15 and 16) which are controlled by the mechanisms to be described later. The movements of the wedges 88 involve a risk, if they are not controlled automatically, for example: a lowering of the pistons 90 of the platform before the wedges 88 are withdrawn, could mean the fall of the platform 60 or 60' without elements of suspension of any kind. This risk has been overcome because first the platforms 60 or 60' automatically rise, then the wedges 88 enter to occupy their places below the platform, conversely the wedges 88 will first be withdrawn and then the platform 60 or 60' will be lowered as can be seen in FIGS. 15 and 16.

In order to synchronize the rising movements of the platforms 60 or 60' with the latter starting or movement of the wedges 88, the mechanism will have a valve 109 that works by differences of pressure, the valve can be seen in the scheme of the FIG. 16, but it will be placed on the control stand 25 where it is shown in FIGS. 19 and 24. This valve 109 communicates with the conduit 108 that feeds the cylinder 91, which is the one that elevates the platform. Valve 109 drives, with its lever 191, the cock 110 interposed between the pipes 105 and 111 which receive pressure fluid through the cock 103 though normally this fluid is stopped at the cock 110 which closes its passage (FIG. 16 and 19).

Said valve 109 has a hydraulic cylinder 219 on its lever 191 to dampen the abrupt movements.

When the platform 60 (according to the drawings) has risen, the hydraulic pressure inside the pipe 108 will increase because the pump 163 is still pumping, so that the valve 109 moves the lever 191 and to open cock 110 thus letting the hydraulic pressure fluid through the pipes 105 and 111 to the cylinder 89 which advances the wedges 88 below the platform 60 (FIGS. 16 and 19). It is convenient that the wedges 88 of each side of the machine be joined by a rod so as to make their movements coincide and moreover in case one is subject to a greater friction than the others, the latter will help to overcome this friction. Practice has proved that it suffices to make one perforation in each wedge and to pass a rod through the perforations.

It will be convenient to effect the descent of the platform at will of the worker by means of a pneumatic pushbutton valve 112 (FIGS. 16 and 25), pressed by hand pressure, because the descent does not require a perfectly controllable injection cycle, but merely the removal of parts from the mold of the platform 60'. Said valve 112 situated on the control stand will therefore serve to transfer the mechanical order of lowering the platform 60 before which the wedges 88 will have left their positions below said platform. Pushing valve 112 passes pressure fluid through the pipe 192 (FIG. 16)

to move the piston in cylinder 101 to the right which moves cock 103 to let the pressure pass through the pipes 104 and 113 to reach the hydraulic cylinders 89 through the pipe 193. The wedges are thus withdrawn from below the platform 60. The rod of the cylinder 89 is joined by a lever to the cocks 114 which are moved when the wedges 88 withdraw; through said cocks 114 circulates the hydraulic pressure fluid that will drive the cylinder 106 which has to change the position of cock 107 to start the descent of the platform because then the hydraulic pressure fluid of the cylinders 91 can return to the tank 164 through the pipe 194.

Between one elevation and one descent of platform 60 or 60' there will always take place one descent of extractors 63, 64 and one elevation of same. The descent, as we have already seen, is realized in connection with the elevation of the platform. With regard to the elevation of the extractors, this is always controlled manually by push contact of a manual valve when the inner cores have been taken out of the cast parts, as molding portion of the working cycle may vary as to time.

For the longitudinal movement of the platforms 60 and 60', the machine has two single acting cylinders 138 and 139 (FIGS. 14 and 17), the pistons of which are joined by the rod 195 having some appendages 196. These latter fit into the grooves at the bottom of the platforms to join said platforms to the rod in such a way that when said rod is moved lengthwise towards one side or another it drags along the platforms 60 and 60' which glide on a roller train 117. The platforms pass alternatively inside and outside the press frame 123 driven by said cylinders 138 and 139.

When the platform 60 has descended and the rods 90 of the hydraulic cylinders 91 have reached the end of their course (FIG. 17), the platform 60 situated within frame 123 begins automatically its longitudinal movement to the place where the cast part is taken out of the mold by action of the hydraulic cylinder 139. Platform 60 will drag along in its movement also the platform 60' on which previously have been placed the inner cores 49 of the molds ready to receive work.

In order to obtain an automatic and synchronized longitudinal movement of the platforms 60, 60' with the movement of descent of same, there are arranged fittings of pipes, cocks, feelers and pressure cylinders whose relation to each other can be seen in FIG. 17. These fittings include the pushbutton valves 115 and 120 placed at the control stand 25, while the pushbutton valve 116 is situated near the lower part of the cylinder 91 to be contacted by the arm 197 joined to the rod 90 so that contact is established only when the piston 90 has reached the lower end of its course. This does not happen until the platform 60 rests on the pulleys 117 avoiding the starting of longitudinal movement while the conical end of the rod 90 is still engaged in cavity 118 of the platform. The pushbutton valve 116 is connected through the pipe 119 to the compressed air accumulator 13 and the pushbutton valves 115 and 120 on the control stand receive pneumatic pressure through the pipe 198 controlled by the valve 116 so that even when valves 115 and 120 are pushed, they will not work if the piston rod 90 has not descended and pulled completely out of the platform 60.

The cylinder 138 (FIG. 17) communicates through the pipe 136 with a four way cock 135 to which the cylinder 139 is connected by means of the pipe 137. This cock 135 receives the hydraulic pressure fluid through the pipe 199 connected to the pressure pump 163 with interposition of the three way cock 222 that is employed to prevent the entrance of pressure into the system. This cock is moved by the pneumatic cylinder 223 with pressure intakes that are not shown in said FIG. 17.

The hydraulic pressure pump 163 supplies from the tank 164 the fluid to the system. The cock 135 has connected a pipe 200 for the back flow of the liquid to the tank 164.

The four way cock 135 is driven by the double action hydraulic cylinder 134 which receives the fluid at one or the other end by means of the two pipes 201, 202 that come from the cock 133. This cock in turn has connected the pipe 203 that receives the pressure liquid from the pipe 199 and the pipe 204 for return flow of fluid to the tank through the pipe 200. The cock 133 is moved by the pneumatic double acting pressure cylinder 132 having two pipes 125 and 126 for pressure fluid to move it in one or another direction. Pipes 125 and 126 are respectively connected to cocks 121 and 122, and by the pipes 129 and 130, having interposed pushbutton valves 127 and 128. Both pipes 129 and 130 receive the compressed air from the pipe 119 having the pushbuton valve 116.

The platforms 60 and 60' have on one side the rocking pins 151 and 151' which press the pushbutton valves 127 or 128 during sliding movements of the platforms.

It will be deduced from the above, that the cocks 121 and 122 situated on the control stand 25 control the cylinder 132, and by means of same and the cock 133, the cylinder 134 and the cock 135, and the cylinders 138 and 139 move the platforms 60 and 60' longitudinally in one or another direction. But to make said cocks 121 and 122 operative, it is necessary that the arm 197 pushes the valve 116 and that the pushbutton valves 127 or 128 are also being pushed by the pins 151 and 151'.

The manual cocks 121 and 122 are arranged on the control stand to avoid automatic longitudinal movements of the platforms at a certain moment.

It had been possible to do without the cock 133 and the cylinder 134, making the cylinder 132 move the cock 135 directly, but owing to the great size required for one cylinder and the resistance it offers to the movements, it has been considered more convenient to move cock 135 hydraulically because the use of high pressures is easier.

In order to establish greater safety and prevent the elevating cylinders 91 from working when the platforms 60, 60' are not correctly situated longitudinally in their working position, a hydraulic circuit has been arranged to include the pipes 232 and 232', FIG. 17, in which are interposed two valves 230, 230a driven to closed condition mechanically by the pins 248, 248' situated at the outer ends of each of the platforms 60, 60'. Said circuit is connected through the pipes 105 and 249 to the cock 103 and to the cylinder 106, FIG. 16, in such a way that until one of the pins 248, 248' has moved away and thus opened the valve 230 or 230a the piston of the cylinder 106 cannot displace itself to move the cock 107 that gives passage to the hydraulic pressure fluid which acts on the elevating cylinders 91.

There are only two of the described movements of the machine which will be convenient to start manually and at will at the control stand 25. These movements are the descent and elevation of the extracting platforms 63 and 64. This is so because the descent of one of the platforms 60 or 60' depends on the time employed in taking the cast parts out of the molds on the other platform (taking into account that the longitudinal displacement movement is automatic when the platform reaches its lowered position). The same is true of the elevation of the extracting platforms 63, 64 with the cast parts hanging from the half molds held by vacuum. This operation will depend on the time employed in extracting the inner cores. Nevertheless when the manual dexterity of the workmen allows it, one can do without said voluntary manual procedures, making them also automatic for which purpose is added the cam mechanism in the box 148.

For lifting and lowering the platform 60 or 60' the machine has four hydraulic pressure cylinders 91 which generally will be placed in a pit (FIGS. 14 and 15). So that all pistons of the four cylinders move in unison without advancing one before another which would unbalance the horizontal attitude of the platforms, some collars 142 are arranged on the pistons or rods 90 which hold some toothed bars or racks 139, which mesh with the pinions 140 in turn meshed to one another and keyed on the shafts 141. These shafts bear at their other ends, two other meshing pinions for the same purpose.

It is important that the rods 90 of the cylinders 91 have highly tapered ends that enter into the cavities 118 of the same shape in the platforms 60 and 60'. Thus one obtains automatically the centering of the platform in its lifting movement.

When the platform 60 has risen placing the upper half molds 47 against and fitted to the lower ones 160, the injection of the paste must begin followed by the inflation of the resilient liners 159 and their deflation coinciding with the injection of air for separation of the cast parts from the molds. All these phases have already been explained, nevertheless there remains still to be said how they are related automatically one with the other and the means employed.

In order to control both the automatic and manual operation of the machine, control stand 25 is provided situated separate from the machine but near it so that the worker can follow with his eyes all its phases. This stand is shown on the FIGS. 1, 17, 19, 20, 22, 24 and 25. On this stand which is constituted by a metallic frame, are mounted some pneumatic or hydraulic pressure cylinders and the cocks for their control, as well as the ends of the pipes to which they are joined and which we have previously dealt with when describing the respective circuits shown in the referred figures under the same numbers by which they have previously been designated. In addition the control stand 25 has the following elements:

On one side the electric motor 145 (FIGS. 20 and 24) is mounted having its axle connected to a speed governor 146, and this in turn is coupled to a speed reducer 147 all of which is not described nor shown in detail on the drawings because it is well-known. The shaft of the reducer 147 is coupled to the shaft 152.

On shaft 152 (FIGS. 20, 21 and 21a) are mounted three gear wheels 224a, 224b, 224c and three cams 165, 166 and 167 all of which are contained in the box 148.

Parallel to the shaft 152 is situated the shaft 225 with the gear wheels 224, 224' and 224" which mesh with gears 224a, 224b and 224c of the shaft 152, thus making possible change of speed of the shaft 225 according to the selected position of transmission. There are also on shaft 225 three guides 206, 206' and 206" that will facilitate the work of the cams 165, 166 and 167 avoiding any imprisoning of the rods 207 which the movement of the cams may produce.

The rods 207 will move the pushbutton valves 21, 22 and 205 having return springs and which will stop or permit the passage of compressed air through them as required.

The selected speed combination will permit that the shaft 152 in relation with the shaft 225 to give from one to three revolutions.

On the shaft 225 is situated the arm 226 that acts on the electric pushbutton switch 250 to stop the motor 145 on each revolution of the shaft 225.

The mentioned motor 145 is started by means of an electric switch 144 operated by a pressure differential valve 143, FIG. 19a. This valve is connected to the pipe 111 and consists (FIG. 19a) of a small hydraulic cylinder with a counterweight 227 fitted to its piston 228 so that it acts only when the pressure has risen to the maximum, i.e. at the moment at which the valve 109 (FIG. 16) has opened the valve 110 and the pressure fluid has entered into the pipe 111 and has reached the maximum pressure in this pipe, so that after the wedges 88 have been introduced below the platform 60 the rod 228 is elevated to close the electric switch 144 for starting the motor 145.

On the other side of the control stand 25, FIGS. 19, 22, 23, 23a, 24 and 25 there is another motor 154 coupled to a speed governor 155 and this in turn to a reducing box 156 all of which is well known for which reason it is not described nor shown in detail on the drawings. The shaft of the reducer 156 is coupled to the shaft 176 situated inside the feed mechanism case 157. On this shaft is firstly a gear wheel 179 and the cams 208 and 208'. Parallel to the shaft 176 and on the same vertical level is another shaft 177 with the gear wheel 178 that meshes with gear 179 on the motor shaft 176. Beyond gear wheel 178 are located twelve cams 180. The shaft 177 is driven by the set of gear wheels 179 and 178.

The balance beams 174 in FIG. 23a are each fitted to a hinge 175 at one end and suspended at their other end from a spring 231. These beams are placed between each of the twelve cams 180 and the cams 208, or 208', and are used to transmit, by means of the connecting rods 182 with the links 181 and 183, the movement of the cams to the levers that drive the hydraulic valves 184, FIG. 22.

The shaft 176, FIG. 23 has a lever arm 20, fixed at its end 162, which will engage the electric switch 221 breaking the current that feeds the motor 154 at each revolution of shaft 176.

The pneumatic pushbutton valve 21, FIG. 20, controls the small pneumatic cylinder 153 in such a way that it moves the electric switch 169 to start the motor 154.

The lever handles 209, FIG. 23a linked with the arms 210 situated on each cam are used to move the cams 180 out of their working positions so that they cannot act on the balance beams 174 leaving the respective connecting rod 182 immobilized when slurry feed to a given mold is unnecessary.

At one side of the control stand, as can be seen on FIG. 24, are the two special membrane valves 158 and 161 that are connected to the pneumatic pipes coming from the cam operated, automatic valves 22 and 205 (FIG. 18a) which make valves 158 and 161 act to control the inflation of the rubber liners 159 surrounding the cores 49 and also to control the injection of the air between said liners and the cast parts.

Valves 158, 161 are composed, as can be seen in FIG. 18, of a body 96 with two perpendicular bores 98 and 99 communicating internally and having at their mouths two plates 211 with orifices 212 for mounting to the corresponding flanges of pipes for the conduction of compressed air. The bore 98 has in its interior an enlarged diameter with a truncated conical seat 94 and, at its opposite end another larger widening. The body 96, is joined by the screws 213, 214 to another body 215 of T-shape having a bore 100 perpendicular to another bore disposed as an extension of the bore 98. This last body 215 has a socket piece in which is screwed another body 216 having a cavity covered by the lid 217 joined with screws by which a membrane 173 is fixed. A piston 92 rests on the membrane and has a stub axle 251 on which is screwed a rod 93 placed in the aligned bores of the three parts and which has a certain possibility of axial movement. Said rod 93 has at one end a truncated, conical shaped tip to act as obturation valve of the orifice 98 and towards its middle it has a widening 95 with an appropriate bevel to act also as obturation valve of the inner conduit 99. The chamber 97 formed below the membrane 173 has an outlet orifice 218 to which is connected the rubber pipe that comes from the valve 22.

The orifices 98 of the valves 158 and 161 are connected to the compressed air accumulator 13 through the pipes 252, 252' (FIGS. 18a and 24). When the pressure through orifice 218 on the membrane 173 is cut off by the valve 22, the rod 93 is pushed down by the pressure from accumulator 13 and moves axially until the widening 95 seats on the inner truncated, conical valve seat thus closing the passage of the pressure fluid to the orifice 100. Therefore, the pressure fluid will enter through 98 and pass through 99 to the pipes 54, 55 (FIGS. 18a, 5 and 7) that conduct it to the molds in order to inflate the rubber liners 159 that cover the inner cores 19.

When the valve 22 is not moved by the corresponding eccentric in cam box 148, the pressure sets again on the membrane 173 and the rod 93 is lifted to close the orifice 98 to the entrance of pressure fluid from accumulator 13, and the widening 95 permits the exhaust through bore 100. Thus the air accumulated in the resilient liners can flow back through bore 99 and leave through bore 100 to the exterior.

The supply of compressed air between the resilient liner and cast part is controlled by the valve 205 in the same manner but through valve 161 and conduit 55, FIG. 5.

As previously explained, and as can be seen in FIGS. 16, 19 and 24, a pressure differential valve having the parts 109, 191 and 219 will set when the platform 60 or 60' has risen so that the wedges 88 move to occupy their places below said platform, i.e. at the moment when the pump 163 is realizing its utmost stress. Then the electric switch 144 (FIG. 24) is moved by differential pressure valve 143, FIG. 19a, to start the motor 145 which drives the speed governor 146 and reducer 147 as well as the cam assembly in box 148, and begins the slurry feeding phase. The valves 21, 22, 205 (FIGS. 20, 24) control the three manufacturing phases: valve 21 drives the cam assembly in box 157 by starting the motor 154 as has been explained. This phase will end when the motor 154 is automatically disconnected by the circuit breaker switch 250 (FIG. 21a).

The valve 22 controls the inflation of the resilient liners 159 and the pulser 205 supplies the injection of air between the liners and the cast parts.

The revolutions of the motor 145 are transmitted to the shaft 152 through the reducer 147 at the desired speed so that the three cams 165, 166, 167 (FIGS. 21 and 21a) will act separately and at a different moment as well as with different time duration on the valves 21, 22 and 205. The valve 169 (FIG. 20) starts, by means of the pneumatic cylinder 153 and switch 169, the motor 154 (FIG. 22) to turn the speed governor 155, reducer 156 and cam assembly in box 157 thus effecting the injection of slurry into the interior of the molds as will be seen later. When the slurry feed has finished the cam 166 pushes the valve 22 that will cut the passage of the pressure fluid on the membrane 173 of the valve 158 (FIG. 18).

After completing the inflation of the liners 159, the cam 166 (FIG. 21) will allow the valve 22 to return to its normal position, the pressure acts on the membrane of the valve 173 (FIG. 18) and the pressure within the liners 159 will diminish until it disappears, said liners returning then to their original state. As the shapes of the cams 165, 166, 167 have previously been calculated, their action finishes at the proper moment so that there does not exist any irregularity among the manufacturing phases. Everything has been arranged previously, the cams which need it, have been rectified and the working speed has been altered by means of the speed governor 146. Thus it is not strange that when the inflation of the liners is complete and they begin to lose pressure, the valve 205 that is being moved by the cam 167, drives the valve 161 (FIG. 24) which is similar to valve 158, but with the mission of injecting the compressed air through the ducts 55, pivot connection 170a and duct 172, FIGS. 7 and 10 to enter the molds at the free space 56 between the resilient liners 159 and the rings 131 and so contract the liners which return to their normal condition.

The injection of slurry into the molds is effected as follows: The feeding valve 21 is operated by the cam 165 (FIG. 21); the cylinder 153 will close the switch to start the motor 154 of the speed governor 155, reducing coupling box 156 and feeding cam assembly 157.

Each cam in box 157 will drive a balance beam 174 and each of them a connecting rod 182 that moves the respective cock 184, FIG. 22, so that the corresponding cylinder 41 (FIGS. 4 and 15) is operated to elevate the pistons 36 in the interior of the injectors 33 as well as the gates 43. The slurry will then enter into the molds through pipes 34 of injectors 33.

On the control stand 25 that can be seen in horizontal section in FIG. 25, appear the following control elements and indicators:

245, regulator to alter the speed of the cams in 148.

244, manometers and vacuum meters.

121 and 122, control to cut the automation in the displacement of the platform.

239, control to cut the automation in the descent of the extracting platforms.

238, control to cut the automation in the elevation of the platforms of the press.

245', regulator to alter the speed of the paste feeding cam assembly in box 157.

242, pushbutton pneumatic valve for shutting off of the hydraulic pressure.

243, pushbutton pneumatic valve to let the penumatic pressure through, to the plant.

233, pushbutton pneumatic valve for the non-automatic elevation of the platforms.

112, pushbutton pneumatic valve for lowering of the platforms non-automatically.

235, pushbutton pneumatic valve for the non-automatic elevation of the extractors.

234, pushbutton pneumatic valve for the non-automatic lowering of the extractors.

240, pushbutton pneumatic valve for the displacement of the extractor.

241, pushbutton pneumatic valve to put the extractor in working position.

120, pushbutton pneumatic valve for the non-automatic displacement of the platform.

115, pushbutton pneumatic valve for the non-automatic displacement of platform.

205, automatic valve for the injection of air to separate the core liner from the cast-piece.

22, automatic valve for the injection of air into the resilient liners.

21, automatic valve to drive the cam assembly in box 148.

209, interruptor of the slurry feeding cams.

246, control lights to indicate when the motors of the control stand are working and whether the machine is connected to the electric network or not, including also some pneumatic valves for connecting and disconnecting the electric supply.

Finally, it must be stated that the above described machine can be manufactured in several sizes and forms and for various production capacities, and moreover can be altered in all those details of construction which the practice and the different molding requirements might advise, as long as the essentials are maintained as summarized in the following.

I claim:

1. Machine for the manufacture of asbestos cement parts comprising relatively movable mold supports for carrying pairs of mold parts which upon movement toward each other of the supports engage to form mold chambers, a continuous pipe surrounding said mold supports and forming a closed circuit for carrying a fluid asbestos cement slurry, a plurality of branches for connecting said pipe to the interiors of said mold chambers each said branch having valve means for control of slurry egress to a mold chamber, a feed hopper for slurry having agitating means in its interior, said pipe being connected to said feed hopper through a three way cock capable of shutting off feed of slurry from the hopper, a second three way cock for connecting said pipe to a drain outlet, a pressure pump and a pressure vessel connected in series in said closed circuit to apply pressure to circulate slurry in said closed circuit, and means for automatically controlling said first three way cock to admit slurry from the hopper to said closed circuit when the slurry in said pressure vessel is below a predetermined level.

2. Machine for the manufacture of asbestos cement parts according to claim 1, wherein said means for automatically controlling said first three way cock includes a fluid pressure cylinder connected to a pressure fluid accumulator through a duct having a valve normally maintained open by spring means, and a manometer connected to said pressure valve and operative to control electromagnetic means for closing said valve.

3. Machine for the manufacture of asbestos cement parts according to claim 1, wherein said valve means comprises a slurry injecting mechanism in each of said branches, each said mechanism comprising a straight tubular body for connection at one end to a mold chamber, a branch tube connected by a mouth at one end to one of said branches and at the other end to said tubular body, a piston slideable in said straight tubular body to close and open said mouth of said branch tube, a rod connecting said piston with a guided gate member for entering a paste inlet port of the mold chamber, said gate member having a rubber covered zone for closing said paste inlet port, and fluid pressure means operatively connected to said piston to move the same to close or open both said branch mouth and said inlet port simultaneously.

4. Machine for the manufacture of asbestos cement parts according to claim 3 further comprising an electric motor connected through a speed reducer to one of a pair of parallel shafts geared one to another, one of said parallel shafts having two long cams and the other shaft having a plurality of short cams, a plurality of balance beams each with projections on opposite sides arranged to engage a long and short cam respectively, one end of each balance beam being pivotally supported, and the other end being suspended by a spring, a connecting rod hinged to said other end of each balance beam and connected at its free end to a crank connected to a cock said cocks each controlling a pressure cylinder which operates said slurry injecting mechanism, each said slurry injecting mechanism being controlled as to start and stop by the shapes of said plurality of cams, each of said plurality of cams being removable and exchangeable on its shaft and each having a lever with an arm engaging the cam for moving the cam out of reach of the corresponding balance beam.

5. Machine for the manufacture of asbestos cement parts comprising a pair of relatively movable half molds which when engaged define a mold chamber, a tubular inner mold supported by one of said half molds, an inflatable tube surrounding said inner mold, a ring of flexible material surrounding one end of said inflatable tube, said ring having an extension of truncated conic form, covering aligned openings in said inflatable tube and inner mold, an opening in said ring aligned with a paste inlet into the mold chamber, a first air inlet duct extending through the said supporting half mold to the line of contact between said ring, inflating tube and inner mold to introduce compressed air between said inflatable tube and a cast part, and a second air inlet duct connected to the interior of said inner mold for introducing compressed air between the inner mold and the inflatable tube.

6. Machine for the manufacture of asbestos cement parts according to claim 5 wherein is provided a pneumatic circuit for supplying compressed air to said mold chamber, said circuit including two membrane valves each having a body with a longitudinal bore and two lateral branches, one of said branches leading to said mold chamber and the other branch opening to the atmosphere, a cylindrical rod having a truncated conical end, a collar with a truncated conical surface movable in said longitudinal bore to close and open two truncated conical valve seats one leading to a source of compressed air and the other being situated between said two lateral branches, a piston carried by said rod and movable in a chamber attached to said body, said chamber being crossed by an elastic membrane on which the piston rests, said chamber having an outlet hole to atmosphere, said membrane valves being so connected to said mold chambers as to control the flow of air to inflate the elastic lining of the internal mold, and to inject air between the lining and a molded part respectively.

7. Machine for the manufacture of asbestos cement parts, comprising a frame mounting a fixed half mold, a platform movably mounting a second half mold for relative movement to engage and disengage the fixed half mold, fluid pressure means for moving said platform including a fluid pressure accumulator, a first pressure fluid circuit including a valve and a pressure fluid cylinder operatively connected to a four-way cock, a fluid pressure security circuit connecting a second accumulator to said four-way cock and including a double acting fluid pressure cylinder operative to move a second cock having a duct connecting the second accumulator to a fluid pressure jack for moving said platform, and means on said platform for engaging and actuating said valve to actuate said first pressure fluid cylinder.

8. Machine for the manufacture of asbestos cement parts according to claim 7 wherein is further provided a set of wedges, each secured to the piston of a second double acting fluid pressure cylinder, said wedges being arranged at both sides of said frame and movable into the path of said platform to prevent disengagement of the mold halves, a pressure differential valve for operating said second, wedge moving cylinder having a cylinder connected to the said duct of said platform moving jack, a piston in said cylinder connected to a lever which in turn is connected to a cock which controls passage of pressure fluid to one end of said second, wedge moving cylinder, the other end of said wedge moving cylinder being connected to said four-way cock, each wedge being provided with a lever connected to a cock in a line feeding pressure fluid to one end of said first double acting cylinder for reversing said second cock.

9. Machine for the manufacture of asbestos cement parts, according to claim 7, wherein is additionally provided a plurality of said platforms, two fluid pressure cylinders arranged horizontally at opposite sides of said frame, the pistons of said two horizontal cylinders being united by a traction bar having vertical elements secured thereto which enter cavities in the lower sides of said platforms and move the platforms horizontally.

10. Machine for the manufacture of asbestos cement parts according to claim 9, wherein two pipes conduct pressure fluid from an accumulator to said horizontal cylinders respectively through a four-way cock, a third pipe connects said four-way cock to a pump connected to said accumulator, there being interposed between said pump and the four-way cock another cock operated by a pressure cylinder, said four-way cock being connected through a fourth pipe to said accumulator for return of fluid, a double acting cylinder connected to said four-way cock for operation thereof, fluid feeding pipes to said double acting cylinder controlled by another double acting cylinder having two connecting pipes controlled independently by manual cocks arranged in a separate fluid circuit connected to another pressure accumulator, said separate fluid circuit including valves operable by engagement with a pair of elements carried by said moving platforms, a branch duct leading from said other accumulator having two automatic valves 115, 120, and a third valve situated in the main portion of said separate circuit close to the platform moving jacks and operated by a member secured to the pistons of said jacks.

11. Machine for the manufacture of asbestos cement parts according to claim 7 wherein a plurality of said jacks are provided for moving the platform, each jack including a piston rod, a toothed bar secured to and parallel with each said rod, a pair of pinions between every pair of said toothed bars and having gear teeth meshed with each other and the adjacent bar, and all of said pinions being mounted on one or another of two shafts.

12. Machine for the manufacture of asbestos cement parts according to claim 7, wherein is additionally provided a framework arranged above said frame and projecting at both sides therefrom, a pair of platforms suspended from opposite projecting ends of said framework, fluid pressure means for simultaneously raising and lowering said pair of platforms, said framework having wheels which roll on rails transverse to said pair of platforms, a pressure cylinder to move said framework on the rails, said pair of platforms carrying half molds on their lower surfaces, having the same shape as the cast parts to be removed from said mold chambers.

13. Machine for the manufacture of asbestos cement parts according to claim 12, wherein is additionally provided another fluid pressure circuit having a valve 84 operable by movement of said movable platform when moving away from said fixed half mold to admit pressure fluid to a pair of connected cocks, one of which is operatively connected to three other valves to control synchronized operation of said jack moving said movable platform and said fluid pressure means for simultaneously raising and lowering said pair of platforms.

14. Machine for the manufacture of asbestos cement parts according to claim 8, wherein said wedge moving cylinder is fed pressure fluid through a pipe having an overpressure valve connected thereto, an electric switch operatively connected to said overpressure valve for control of a motor, said motor being mechanically connected to a cam mechanism for control of slurry injection and mold liner inflation, said overpressure valve having a movable rod supporting a counterweight at one end, and means at the other end of the rod to operate said electric switch.

15. Machine for the manufacture of asbestos cement parts according to claim 14, wherein said electric motor is controlled by speed varying means and is coupled to a speed reducer whose output shaft drives a first shaft situated inside said cam mechanism, a second and parallel shaft in said mechanism connected by gears to said first shaft, a plurality of cams mounted on said first shaft which bear against respective arms pivotally mounted on the second shaft, a plurality of valves actuated by rods moved by said arms to automatically operate fluid pressure circuits for sequentially feeding slurry to said mold chamber, stopping the slurry feed, inflating said tubular mold lining and feeding air between said tubular mold lining and a cast part.

References Cited by the Examiner

UNITED STATES PATENTS

| | | | |
|---|---|---|---|
| 2,384,912 | 9/1945 | Helin | 162—337 |
| 3,010,511 | 11/1961 | Esteve | 162—227 |
| 3,010,869 | 11/1961 | Esteve | 162—412 |

FOREIGN PATENTS

| | | |
|---|---|---|
| 40,146 | 12/1909 | Austria. |
| 127,598 | 11/1960 | U.S.S.R. |

DONALL H. SYLVESTER, *Primary Examiner.*

ROBERT F. WHITE, HOWARD R. CAINE, *Examiners.*

J. H. NEWSOME, *Assistant Examiner.*